United States Patent
Dreesen

(10) Patent No.: US 12,032,962 B2
(45) Date of Patent: Jul. 9, 2024

(54) METHOD FOR CONTROLLING AN AUTOMATION SYSTEM HAVING VISUALIZATION OF PROGRAM OBJECTS OF A CONTROL PROGRAM OF THE AUTOMATION SYSTEM, AND AUTOMATION SYSTEM

(71) Applicant: Beckhoff Automation GmbH, Verl (DE)

(72) Inventor: Ralf Dreesen, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 14 days.

(21) Appl. No.: 18/150,339

(22) Filed: Jan. 5, 2023

(65) Prior Publication Data

US 2023/0146492 A1 May 11, 2023

Related U.S. Application Data

(63) Continuation of application No. PCT/EP2021/070993, filed on Jul. 27, 2021.

(30) Foreign Application Priority Data

Jul. 28, 2020 (DE) ..................... 10 2020 119 853.1

(51) Int. Cl.
*G06F 9/30* (2018.01)
*G06F 8/41* (2018.01)

(52) U.S. Cl.
CPC .......... *G06F 9/30134* (2013.01); *G06F 8/434* (2013.01)

(58) Field of Classification Search
None
See application file for complete search history.

(56) References Cited

U.S. PATENT DOCUMENTS 6,961,924 B2 11/2005 Bates et al.
9,436,602 B2 9/2016 Schuh
(Continued)

FOREIGN PATENT DOCUMENTS

CN 103514099 A 1/2014
CN 107045478 A 8/2017
(Continued)

OTHER PUBLICATIONS

International Search Report and Written Opinion dated Oct. 19, 2021 in connection with International Patent Application No. PCT/EP2021/070993, 27 pages including English translation.
(Continued)

*Primary Examiner* — Scott C Sun
(74) *Attorney, Agent, or Firm* — Dorsey & Whitney LLP

(57) ABSTRACT

A method for controlling an automation system with visualization of program objects of a control program of the automation system, comprises determining a pointer address of the pointer element, determining a first address offset of the pointer address, identifying a program object that is spaced apart from the first memory location of the program state by the first address offset according to the arrangement structure of the program state as a first program object, the memory address of which in the first memory area corresponds to the pointer address of the pointer element, identifying the first program object with the pointer object referenced by the pointer element, determining a fully qualified designation of the identified pointer element, and displaying the fully qualified designation of the pointer object referenced by the pointer element on a display element connected to the controller. An automation system carries out the method.

17 Claims, 8 Drawing Sheets

(56) References Cited

U.S. PATENT DOCUMENTS

| | | | |
|---|---|---|---|
| 9,460,239 B1 | 10/2016 | Yunt et al. | |
| 10,608,933 B2 | 3/2020 | Fujieda et al. | |
| 10,614,051 B2 | 4/2020 | Walbroel | |
| 10,831,884 B1 * | 11/2020 | McIntosh | G06F 9/4486 |
| 2013/0275908 A1 | 10/2013 | Reichard | |
| 2019/0052563 A1 | 2/2019 | Fujieda et al. | |

FOREIGN PATENT DOCUMENTS

| | | |
|---|---|---|
| CN | 108459569 A | 8/2018 |
| CN | 108780304 A | 11/2018 |
| JP | 2003228417 A | 8/2003 |

OTHER PUBLICATIONS

Bacon, Jason W. "The Stack Frame," Nov. 11, 2020, pp. 1-6.
Office Action dated Nov. 19, 2020 in connection with German Patent Application No. 10 2020 119 853.1, 14 pages including English translation.
Office Action dated Aug. 22, 2023 in connection with Chinese patent application No. 202180048549.6, 8 pages including English translation.
Office Action dated Aug. 1, 2023 in connection with Japanese patent application No. 2023-506001, 10 pages including English translation.

* cited by examiner

METHOD FOR CONTROLLING AN AUTOMATION SYSTEM HAVING VISUALIZATION OF PROGRAM OBJECTS OF A CONTROL PROGRAM OF THE AUTOMATION SYSTEM, AND AUTOMATION SYSTEM

CROSS-REFERENCE TO RELATED APPLICATIONS

This patent application is a continuation of International Patent Application No. PCT/EP2021/070993, "Method for Controlling an Automation System with Visualization of Program Objects of a Control Program of the Automation System, and Automation System," filed Jul. 27, 2021, which claims the priority of German patent application DE 10 2020 119 853.1, "Verfahren zum Steuern eines Automatisierungssystems mit Visualisierung von Programmobjekten eines Steuerprogramms des Automatisierungssystems und Automatisierungssystem," filed Jul. 28, 2020, each of which is hereby incorporated by reference herein, in the entirety and for all purposes.

FIELD

The application provides a method for controlling an automation system that allows for visualizing program objects of a control program of the automation system. The application further provides an automation system for carrying out the method.

BACKGROUND

In automation technology, subscribers of an automation system are usually controlled by a controller of the automation system by cyclically executing a corresponding control program. For each cycle in which the respective subscribers are controlled according to the respective control instructions of the control program, information describing the state of the automation system and the control program is recorded and stored by the controller. A so-called program state comprises the complete information necessary to reflect the state of the automation system and the control program. For example, a program state may include the variables, functions, databases, or other objects used in the control program. Furthermore, the program state may include information regarding the subscribers of the automation system or regarding processes running in the automation system.

Such a program state may be recreated after the completion of each control cycle, so that the current state of the automation system and the control program may be reproduced at any time.

When the control program is executed again in a subsequent control cycle, the control program may refer back to the data stored in the global state and thus continue to control the automation system in the subsequent cycle based on the state of the automation system in the previous control cycle.

During operation of an automation system, situations often arise in which various parameters have to be readjusted or processes have to be changed or adapted in order to achieve or guarantee an optimal or optimized operation of the automation system. In order to put the user in a position to follow certain parameters of the automation process controlled by the control program in order to be able to observe the course of the automation process, the problem arises of displaying corresponding parameters or objects of the control program correspondingly stored in the program state to the user, including the respective values. In order to be able to provide the user with a meaningful display that provides directly self-explanatory information regarding the state of the automation process or the executed control program, a display of fully qualified designations of the parameters or objects to be displayed is required. Fully qualified designations may in this context comprise the complete name of the respective parameter or object.

The representation of fully qualified designations is particularly problematic for pointer variables. Here the problem arises that the value of a pointer variable is a memory address of the object referenced by the pointer variable. However, displaying the referenced address as the value of the pointer variable does not provide the user with immediately self-explanatory information because the referenced address cannot be used to immediately determine which object is referenced by the pointer variable.

It is thus necessary to represent the information of objects of the program state and, if necessary, of the stack in which local objects of the control program are stored, including pointer variables and pointer elements of the control program, respectively, in an immediately understandable way. This is of particular interest when executing the control program for controlling an automation process and during execution of a debugging process of a control program.

SUMMARY

An improved method for controlling an automation system having visualization of program objects of a control program of the automation system and an automation system for executing said method are provided.

EXAMPLES

A method for controlling an automation system having visualization of program objects of a control program of the automation system is provided. For example, a controller of the automation system comprises a control program, wherein a program state of the control program is stored in a first memory area of the controller, wherein the program state comprises a plurality of program objects of the control program, and wherein the program objects are arranged relative to one another in a predetermined arrangement structure of the program state.

For example, a memory position and a memory size are assigned to each program object via the arrangement structure, wherein a memory position of a program object defines a number of memory locations by which a program object is stored in a memory area spaced apart from a first memory location of the program state, wherein a memory size of a program object defines a number of memory locations occupied by a memory object in a memory area, wherein the program state comprises at least one pointer element, wherein a pointer object is referenced by the pointer element, wherein the pointer object is a program object of the control program, wherein a stack of the control program is set up in a second memory area of the controller, and wherein program objects may be stored in the stack during a runtime of the control program.

The method comprises; e.g.:
executing the control program in an executing step;
determining a pointer address of the pointer element in a pointer address determining step, wherein the pointer address corresponds to a memory address referenced by the pointer element;

checking whether the pointer address of the pointer element is located in the first memory area of the program state or in the second memory area of the stack in a first checking step;

if the pointer address of the pointer element is located in the first memory area of the program state, determining a first address offset of the pointer address of the pointer element in a first address offset determining step, the first address offset defining a number of memory locations by which the pointer address of the pointer element is spaced apart from a first memory address of the program state in the first memory area;

identifying a program object that is spaced apart from the first memory location of the program state by the first address offset according to the arrangement structure of the program state as a first program object, the memory address of which corresponds to the pointer address of the pointer element in the first memory location in a first program object identifying step;

identifying the first program object with the pointer object referenced by the pointer element in a pointer object identifying step;

determining a fully qualified designation of the identified pointer object in a full designation determining step; and displaying the fully qualified designation of the pointer object referenced by the pointer element on a display element connected to the controller in a displaying step.

This has the technical advantage that a method for controlling an automation system having visualization of program objects of a control program for controlling the automation system may be provided, in which program objects of a program state may be displayed in fully qualified designations of the respective program object in a display element connected to the controller during execution of the control program by a controller of the automation system. In this way, a user of the automation system may be provided with directly comprehensible information of the respective displayed program object. In particular, the method allows for a program object referenced by a pointing element of the program state of the control program to be displayed in the corresponding fully qualified designation.

BRIEF DESCRIPTION OF THE DRAWINGS

The invention is described in more detail with reference to the accompanying figures, which show.

DETAILED DESCRIPTION

Figure 1:
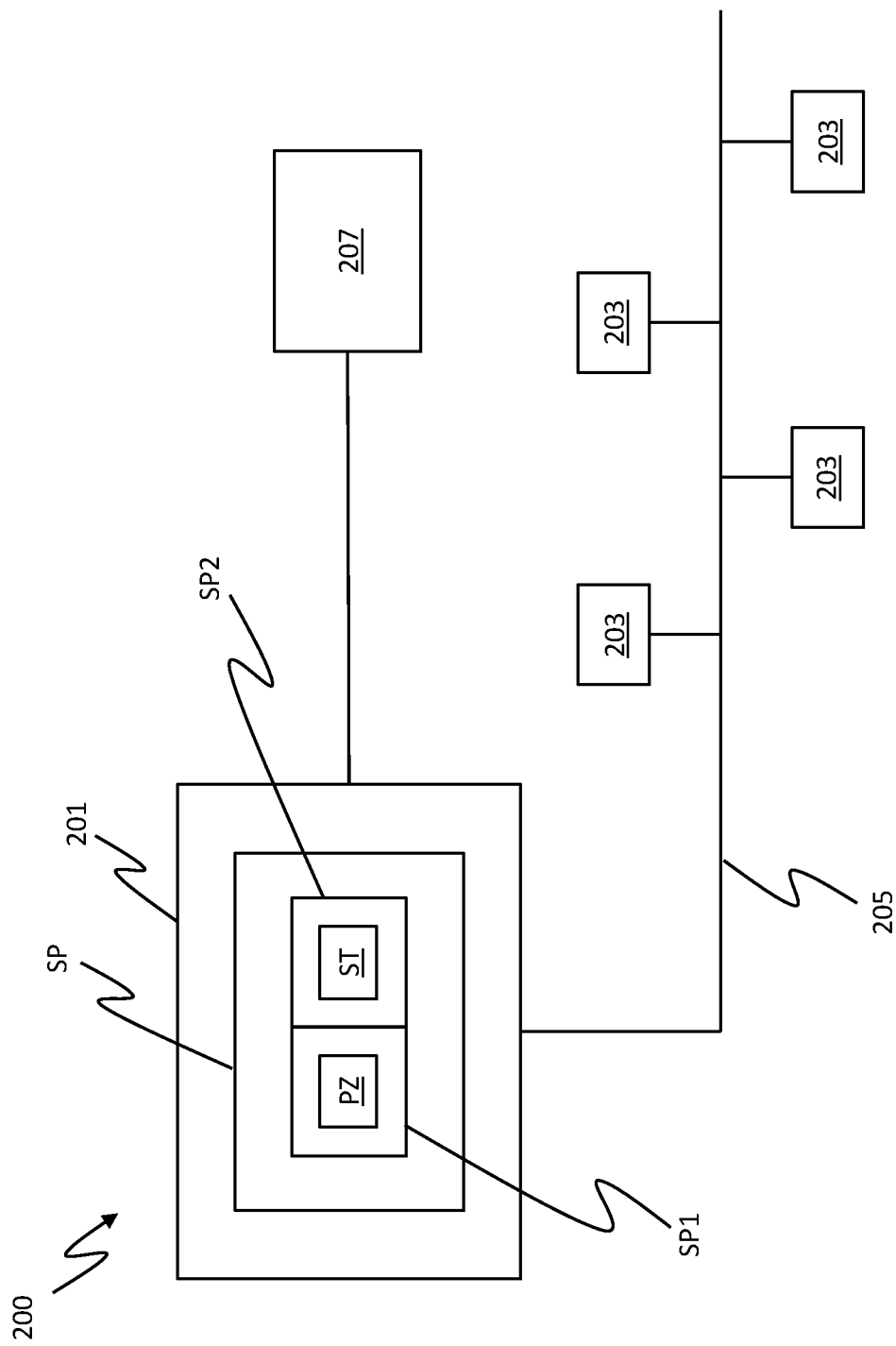
FIG. 1 is a schematic depiction of an automation system according to an embodiment.

A program state of a control program in the sense of the application is a comprehensive set of program objects of the control program, which are arranged in a predetermined arrangement structure. The program objects may in this context be any variables or data objects of the control program and have different data types such as field types, compound types, character string types or number types. Within the firmly predetermined arrangement structure the individual program objects are arranged with regard to one another within the program condition, wherein relations between individual program objects, references of different program objects as well as nestings and/or inheritance allocations of a plurality of program objects are covered, in which a plurality of program objects are arranged as superordinate and subordinate program objects nested into one another. The arrangement structure of the program state remains unchanged during execution of the control program, so that relations between program objects, references of program objects, and nestings of multiple program objects remain unchanged during execution of the control program.

In terms of the application, a pointer element is a pointer variable that references a pointer object. In the sense of the application, a pointer object is any program object of the control program.

In the sense of the applicants, a stack is a runtime cellar in which local variables and functions are stored during the runtime of the control program or during a runtime of subroutines of the control program, respectively.

A pointer address, in the sense of the application, is a memory address of the pointer object referenced by the pointer element.

For the purposes of the application, a memory location is a unit of the memory in which a data unit may be stored. For the purposes of the application, a memory address is a memory location of the memory provided with an address that may be used for referencing or addressing a data object stored in the respective memory location of the memory.

During execution of the control program, the program objects of the control program are provided with values that are stored in the program state and reflect the state of the executed control program or the state of an automation process controlled by the control program. The values of the program objects represent a current state of the automation process to be controlled. Hereupon, a pointer address of a pointer object referenced by a pointer element of the program state is determined and it is determined whether this pointer address is located in a memory area of the program state. For this purpose, the value of the respective pointer variable or the respective pointer element, respectively, may simply be read.

If the pointer address is located in the memory area of the program state, a first address offset of the pointer address with regard to a first memory address of the program state is determined. The first address offset describes a difference between the pointer address and the first memory address of the program state. The program state with the arrangement structure of the plurality of program objects, which cannot be changed during execution of the control program, may be interpreted as a comprehensive data object, e.g. of a compound type, which is stored in a first memory area of the memory provided for this purpose. Within the address structure of the memory, the first memory area of the program state thus comprises a known absolute first memory location corresponding to the first memory address of the memory area within the memory reserved for storing the program state.

Based on the determined first address offset and the arrangement structure of the program state, in which each program object is assigned a memory position and a memory size within the program state, a first program object is in the following identified, the memory address of which in the memory area of the program state corresponds to the pointer address. For this purpose, a number of memory locations is determined for each program object of the program state on the basis of the respective memory position and memory size by which the respective program object is spaced apart from the first memory address of the program state. The program object that is spaced apart from the first memory address of the program state by the number of memory locations determined by the first address offset is identified as the first program object, the memory address of which in the memory area of the program state corresponds to the pointer address.

Since the absolute memory addresses of the individual data objects of the program state are unknown, via the known arrangement structure of the program state, which assigns a memory position within the program state to each program object, and the known absolute first memory address of the program state, a relative address relative to the absolute first memory address of the program state is thus assigned to each program object of the program state via the distance to the first memory address. Via the first address offset, the pointer address is converted into a relative address relative to the first memory address of the program state, so that the program object which has a relative address within the program state corresponding to the relative address of the pointer address, i.e. the first address offset, may be identified as the program object of the program state which has an absolute address corresponding to the pointer address.

Subsequently, the first program object is identified with the pointer object referenced by the pointer element.

This is followed by a fully qualified designation of the referenced pointer object in a display element.

For the purposes of the application, a fully qualified designation of a program object is a designation that allows unique identification of the respective program object. A fully qualified designation may e.g. be a name or a telling designation and may include a complete listing of references or nestings of the program object.

This may provide a method that may specify a fully qualified designation of the respective referenced pointer objects for any pointer elements of a program state of a control program of an automation system and thus provide directly understandable information of the contents of the respective pointer elements.

According to an embodiment, a program object of the program state is embodied as a superordinate second program object, wherein the superordinate second program object comprises at least one subordinate partial program object, wherein the first program object is comprised as a subordinate partial program object by the superordinate second program object, and wherein the first program object identifying step comprises:

identifying, as the superordinate second program object, a program object of the program state for which, according to the respective memory location and memory size, a memory area comprising a memory location spaced apart from the first memory location of the program state by the first address offset, and identifying the superordinate second program object as the program object occupying, in the first memory area of the program state, a memory area comprising the pointer address of the pointer element in a second program object identifying step;

determining a second address offset in a second address offset determining step, wherein the second address offset is determined by a difference between the first address offset and the first relative memory address of the second program object;

determining a data type of the superordinate second program object in a second data type determining step, wherein the data type determines a data structure of the superordinate second program object in which a number of subordinate partial program objects of the superordinate second program object are defined and a memory size and a memory position within the data structure of the superordinate second program object are determined for each subordinate partial program object; and identifying a subordinate partial program object of the superordinate second program object that is spaced apart from a first memory location of the superordinate second program object by the second address offset according to the data structure of the second program object, and identifying the subordinate partial program object of the superordinate second program object as the first program object, the memory address of which corresponds to the pointer address of the pointer element.

This provides the technical advantage of providing a fully qualified designation of a pointer object that has a first nesting depth and is a subordinate program object of a superordinate program object.

For this purpose, a superordinate second program object is first identified on the basis of the first address offset and the arrangement structure of the program state, which occupies an area in the memory area of the program state that comprises the pointer address referenced by the pointer element. For this purpose, again for each program object of the program state a number of memory locations is determined by which the respective program object is spaced apart from a first memory address of the program state. For this purpose, the memory positions and the memory sizes of the individual program objects are taken into account in accordance with the arrangement structure and a corresponding distance from the first memory address of the program state is determined for program objects arranged one after the other in the memory area of the program state.

Subsequently, a second address offset is determined which results from a difference between the first address offset and the first relative memory address of the second program object, and a number of memory locations is defined by which the pointer address of the pointer element is spaced apart from a first relative memory address of the superordinate second program object.

A first relative memory address of a program object is, in the sense of the application, a first memory address, which is occupied by the respective program object in the memory, which is, however, no absolute address of the memory, but is determined relative to the respective superordinate object.

The superordinate object may be the program state, the stack or a superordinate program object, of which the respective program object is comprised. The first relative memory address is thus determined relative to the respective structure of the superordinate object and indicates a distance of the respective program object to the first memory address of the respective superordinate object. If the superordinate object is a superordinate program object, the first relative memory address of the program object comprised by the superordinate program object indicates a distance of the comprised program object to the first relative memory address of the respective superordinate program object. The first relative memory address of a program object thus describes a number of memory locations by which a first memory location of the respective program object is spaced apart from a first memory location of a respective superordinate program object. First relative memory locations and address offsets may thus be added and subtracted, since both variables describe numbers of memory locations.

Subsequently, a data type of the identified superordinate second program object is determined. The data type of the superordinate second program object may e.g. be a field type, a compound type, or a character string type, which in turn comprises a plurality of subordinate program objects. Determining the data type further determines a data structure of the superordinate second program object that comprises a number of the subordinate program objects and assigns each subordinate program object a memory location and memory size within the superordinate second program object.

Taking into account the data structure of the superordinate second program object, a subordinate program object of the superordinate second program object is identified below which is spaced apart within the data structure with regard to the superordinate second program object by the number of memory locations of the second address offset to a first relative memory address of the superordinate second program object. The identified subordinate program object of the superordinate second program object is thus identified as the first program object having a memory address in the memory space of the program state corresponding to the pointer address of the pointer element.

This may provide a fully qualified designation of a pointer object that is a subordinate object of a program object of the program state. This may e.g. provide a fully qualified designation of an element of a field type referenced by the pointer element or a component of a compound type or an element of a character string type. The fully qualified designation may comprise the designation of the superior second program object, i.e. the field type, the compound type or the character string type, as well as the designation of the first program object, i.e. the element of the field type, the component of the compound type or the element of the character string type.

A superordinate program object in the sense of the application is a data object of the program state, which in turn comprises subordinate program objects. A superordinate program object may therefore be a data object of a compound type, a field type or a character string type that in turn comprises elements or components. Subordinate program objects in the sense of the application program are objects of the program state which are comprised by a superordinate program object. Thus, these may e.g. be elements or components of a data object of a compound type, a field type or a character string type. Subordinate program objects may in turn comprise subordinate program objects and thus act as superordinate program objects relative to the comprised subordinate program objects. For example, a data object of a compound type may comprise components that are in turn of a compound type and themselves comprise further components.

Via the data structure of the superordinate program object, which assigns a memory position and memory size to each subordinate program object within the data structure, and by determining the second address offset, which determines the relative distance of the pointer address to the first relative memory address of the superordinate program object and results from the difference between the first address offset and the first relative memory address of the second program object, the pointer address of the pointer element is converted into a relative address relative to the first relative memory address of the superordinate program object.

The first relative memory address of the superordinate program object may be determined via the memory structure and the first memory address of the program state. Within the data structure of the superordinate program object, each subordinate program object of the superordinate program object may thus be assigned a relative address which corresponds to a number of memory location by which the respective subordinate program object is spaced apart from the first relative memory address of the superordinate program object. The subordinate program object that is, within the data structure of the superordinate program object, spaced apart by a number of memory locations from the first relative memory address of the superordinate program object that corresponds to the second address offset is identified as the subordinate program object, the memory address of which corresponds to the pointer address.

According to an embodiment, a program object of the program state is embodied as a superordinate third program object, wherein the superordinate third program object comprises at least one subordinate partial program object, wherein the superordinate second program object is comprised as a subordinate partial program object by the superordinate third program object, and wherein the second program object identifying step comprises:

identifying, as the superordinate third program object, a program object of the program state for which a memory area comprising a memory location spaced apart from the first memory location of the program state by the first address offset is defined according to the respective memory location and memory size, and identifying the superordinate third program object as the program object occupying, in the first memory area of the program state, a memory area comprising the pointer address of the pointer element in a third program object identifying step;

determining a third address offset in a third address offset determining step, wherein the third address offset is determined by a difference between the first address offset and a first relative memory address of the third program object;

determining a data type of the superordinate third program object in a third data type determining step, wherein the data type determines a data structure of the superordinate third program object in which a number of subordinate partial program objects of the superordinate third program object are defined and a memory size and a memory position within the data structure of the superordinate second program object are determined for each subordinate partial program object; and identifying a subordinate partial program object of the superordinate third program object that is spaced apart from a first memory location of the superordinate third program object by the third address offset according to the data structure of the superordinate third program object, and identifying the subordinate partial program object of the superordinate third program object as the superordinate second program object that occupies a memory area in the first memory area of the program state that comprises the pointer address of the pointer element, wherein the second address offset is determined by a difference between the first address offset and a sum of the first relative memory address of the third program object and a first relative memory address of the second program object.

This provides a technical advantage of providing a fully qualified designation of a pointer object referenced by the pointer element that is a subordinate program object of a program object of the program state with triple nesting depth.

For this purpose, a superordinate third program object is first identified on the basis of the arrangement structure of the program state and the first address offset, which occupies an area in the memory area of the program state that comprises the pointer address of the pointer element.

Subsequently, a third address offset is determined based on a difference between the first address offset and the first relative memory address of the third program object, and a number of memory locations is defined by which the pointer address is spaced apart from a first relative memory address of the identified superordinate third program object.

Subsequently, a data type of the superordinate third program object is determined, which defines a data structure of the superordinate third program object and defines a number of subordinate partial program objects of the superordinate third program object and assigns a memory size and a memory position within the data structure to each subordinate partial program object.

Based on the data structure of the data type of the superordinate third program object and based on the third address offset, the second superordinate program object is identified below as a subordinate partial program object of the superordinate third program object as the subordinate partial program object that is in the data structure of the superordinate third program object spaced apart from the first relative memory address of the superordinate third program object by the third address offset and thus occupies an area in the memory area of the program state that includes the pointer address.

Subsequently, the second address offset and the data type of the identified and superordinate second program object are determined in accordance with what has been described above, and the first program object is identified as the pointer object on the basis of the second address offset and the data structure of the superordinate second program object. The second address offset here results from a difference between the first address offset and a sum of the first relative memory addresses of the third and second program objects.

The fully qualified designation of the pointer object may include the name of the first program object, the name of the superordinate second program object and the name of the superordinate third program object as well as a nesting hierarchy. This means that fully qualified designations may be specified for pointer elements that are e.g. elements of a field type, which in turn is an element of a field type.

The procedure is analogous to the procedure described above for the embodiment in the case of the superordinate second program object, in which respective relative addresses of the comprised subordinate program objects are determined as distances of the memory positions of the respective subordinate program objects relative to a first relative memory address of the respective superordinate program object. The subordinate program object the relative address of which corresponds to the respective address offset or occupies a memory area which includes a memory address which is spaced apart from the first memory address by the respective address offset is identified as a program object the memory address of which corresponds to the pointer address, or the memory area of which includes the pointer address. This process is continued for the respective nesting depths until the pointer object is identified as the subordinate program object the memory address of which corresponds to the pointer address.

According to an embodiment, a program object of the program state is embodied as a superordinate n-th program object, wherein the superordinate n-th program object comprises subordinate partial program objects comprising one another at n−1 nesting depth, wherein the superordinate second program object is comprised as a subordinate partial program object at n−2 nesting depth by the superordinate n-th program object, wherein the first program object is comprised as a subordinate partial program object at n−1th nesting depth of the superordinate n-th program object, where n is a natural number and larger than or equal to 4, and wherein the first program object identifying step comprises:

identifying a program object of the program state for which, according to the respective memory location and memory size, a memory area comprising a memory location spaced apart from the first memory location of the program state by the first address offset, is defined as the superordinate n-th program object, and identifying the superordinate n-th program object as the program object occupying, in the first memory area of the program state, a memory area comprising the pointer address of the pointer element in an n-th program object identifying step;

determining an n-th address offset in an n-th address offset determining step, wherein the n-th address offset is determined by a difference between the first address offset and a first relative memory address of the n-th program object;

determining a data type of the superordinate n-th program object in an n-th data type determining step, wherein the data type determines a data structure of the superordinate n-th program object in which a number of subordinate partial program objects of the superordinate n-th program object are defined and for each subordinate partial program object a memory size and a memory position within the data structure of the superordinate n-th program object are determined;

identifying a subordinate partial program object of the superordinate n-th program object that is spaced apart by the n-th address offset from a first memory location of the superordinate n-th program object according to the data structure of the superordinate n-th program object, and identifying the subordinate partial program object of the superordinate n-th program object as a superordinate n−1th program object that occupies a memory area in the first memory area of the program state that comprises the pointer address of the pointer element in an n−1th program object identifying step;

determining an n−1th address offset in an n−1th address offset determining step, wherein the n−1th address offset is determined by a difference between the first address offset and a sum of the first relative memory address of the n-th program object and a first memory address of the n−1th program object;

determining a data type of the superordinate n−1th program object in an n−1th data type determining step, wherein the data type determines a data structure of the superordinate n−1th program object in which a number of subordinate partial program objects of the superordinate n−1th program object are defined and for each subordinate partial program object a memory size and a memory position within the data structure of the superordinate n−1th program object are determined; and identifying a subordinate partial program object of the superordinate n−1th program object that is spaced apart from a first memory location of the superordinate n−1th program object by the n−1th address offset according to the data structure of the superordinate n−1th program object, and identifying the subordinate partial program object of the superordinate n−1th program object as a superordinate n−2-th program object occupying a memory location in the first memory location of the program state comprising the pointer address of the pointer element in an n−2-th program object identifying step;

if n−2>2 applies, recursively executing the n−1th address offset determining step, the n−1th data type determining step, and the n−2th program object identifying step in one recursion step; and determining the second address offset in the second address offset determining step, wherein the second address offset is determined by a difference between the first address offset and a sum of first relative memory addresses of the n-th program object to second program object;

determining a data type of the superordinate second program object in a second data type determining step, wherein the data type determines a data structure of the superordinate second program object in which a number of subordinate partial program objects of the superordinate n−1th program object are defined and a memory size and a memory position within the data structure of the superordinate second program object are determined for each subordinate partial program object; and identifying the subordinate partial program object of the superordinate second program object that is spaced apart from a first memory location of the superordinate second program object by the second address offset according to the data structure of the superordinate second program object, and identifying the subordinate partial program object of the superordinate second program object as the first program object, the memory address of which corresponds to the pointer address of the pointer element.

This achieves the technical advantage that a fully qualified designation may be provided for program objects that are subordinate program objects of superordinate program objects at any nesting depth.

For this purpose, the steps described above for identifying the individual program objects are executed in n-fold recursion.

By recursively executing the steps mentioned a further nesting depth of the superordinate n-th program object is worked off by executing the steps, until after repeatedly executing of the steps mentioned the second program object is identified. The second program object is in this context the program object which comprises the first program object, i.e. the pointer object referenced by the pointer element, as directly superordinate program object.

First, an n-th superordinate program object is identified based on the arrangement structure of the program state and the first address offset. For this n-th program object an n-th address offset is determined, which determines a difference of the pointer address and a first relative memory address of the superordinate n-th program object. Subsequently, a data type of the superordinate n-th program object is determined, which defines a data structure of the subordinate partial program objects comprised by the superordinate n-th program object. Based on the n-th address offset and the data structure of the superordinate n-th program object, a subordinate partial program object of the superordinate n-th program object is identified which occupies a memory area comprising the pointer address.

This identified subordinate partial program object is identified as an n−1th superordinate program object. Subsequently, an n−1th address offset and a data type of the superordinate n−1th program object are determined, wherein the n−1th address offset results from a difference between the first address offset and a sum of the first relative memory addresses of the n-th and n−1th program objects. Based on the n−1th address offset and the data type of the superordinate n−1th program object, a subordinate partial program object of the superordinate n−1th program object is identified that is spaced apart from a first relative memory address of the superordinate n−1th program object by the number of memory locations of the n−1th address offset and thus occupies a memory area that includes the pointer address.

This identified subordinate partial program object is identified as the superordinate n−2-th program object. Subsequently, the above steps are carried out recursively until the first program object is identified that occupies a memory address in the memory area of the program state that corresponds to the pointer address of the pointer element.

This may provide a fully qualified designation for pointer objects which are subordinate partial program objects of superordinate program objects in n-fold nesting depth. The respective fully qualified designation may comprise the names and designations of all superordinate program objects of the identified pointer object as well as the respective relations and nestings.

According to an embodiment, the method further comprises:

if the pointer address of the pointer element is arranged in the second memory area of the stack, determining a structure of the stack in a stack structure determining step, wherein a memory position and a memory size are assigned to each stack program object stored in the stack via the structure of the stack, wherein a memory position of a stack program object defines a number of memory locations by which a stack program object is stored in a memory area spaced apart from a first memory location of the stack; and determining a first stack address offset of the pointer address of the pointer element in a first stack address offset determining step, wherein the first stack address offset defines a number of memory locations by which the pointer address of the pointer element is spaced apart from a first memory address of the stack in the second memory area;

identifying, in a first stack program object identifying step, a stack program object that is spaced apart from the first memory location of the stack by the first stack address offset according to the structure of the stack in which each stack program object is assigned a memory location and a memory size, as a first stack program object, the memory address of which in the second memory location corresponds to the pointer address of the pointer element; and identifying the first stack program object with the pointer object referenced by the pointer element in the pointer object identifying step.

This achieves the technical advantage that a fully qualified designation may be provided for pointer objects of a pointer element that are stored in the stack of the controller of the automation system. While the pointer element is still a program object of the program state of the control program, the pointer objects referenced by the pointer element are objects of the stack or of the runtime memory and thus are not program objects of the program state.

First, a structure of the stack is determined in which a memory position and a memory size are assigned to each program object of the stack. Similar to the arrangement structure of the program state, a structure of the stack enables a unique positioning of the stack program objects.

In the following, stack program objects are data objects that are stored as local variables in the stack during the execution of the control program or a subroutine of the control program or a function of the control program.

After determining the structure of the stack, a first stack address offset of the pointer address is determined, which defines a number of memory locations by which the pointer address is spaced apart from a first memory address of the stack. This specifies a distance in the memory area that the pointer object referenced by the pointer element and stored in the stack has with regard to from the start of the stack within the memory area of the stack.

Based on the structure of the stack and the first stack address offset, a first stack program object is identified that, within the arrangement of the stack, is spaced apart from the first memory address of the stack by the number of memory locations of the first stack address offset. This first stack program object is identified below as the stack program object having a memory address in the second memory location of the stack that corresponds to the pointer address of the pointer element.

Subsequently, a fully qualified designation of the identified stack program object is provided as a pointer object. This allows for a pointer object referenced by the pointer element that is stored in the stack to be provided with a fully qualified designation that comprises at least the name of the local variable or of the stack program object.

According to an embodiment, the first stack program object identifying step comprises:

identifying, taking into account the first stack address offset of the pointer address of the pointer element and the arrangement structure of the stack, a frame of the stack that occupies, in the second memory area of the stack, a memory area that includes the memory address of the pointer address of the pointer element, in a frame identifying step;

identifying a function of the identified frame of the stack in a function identifying step; and identifying a local variable of the identified function, the memory address of which corresponds to the pointer address of the pointer element, as the first stack program object of the stack, the memory address of which corresponds to the pointer address of the pointer element.

This achieves the technical advantage that the fully qualified designation of the pointer object stored in the stack and referenced by the pointer element may be extended by the designation of a function and a frame. For this purpose, a frame is first identified taking into account the first stack address offset and the structure of the stack, which comprises the identified first stack program object and thus the pointer address in the memory area of the stack. Subsequently, a function of the identified first stack program object stored in the identified frame is identified. Both the designation of the frame and the designation of the function of the first stack program object may be included in the fully qualified designation of the pointer object represented by the first stack program object.

According to an embodiment, a stack program object of the stack is embodied as a superordinate second stack program object, wherein the superordinate second stack program object comprises at least one subordinate stack partial program object, wherein the first stack program object is comprised as a subordinate stack partial program object by the superordinate second stack program object, and wherein the first stack program object identifying step comprises:

identifying, as the superordinate second stack program object, a program object of the stack for which, according to the respective memory location and memory size, a memory area is defined comprising a memory location spaced apart from the first memory location of the stack by the first stack address offset, and identifying the superordinate second stack program object as the program object occupying, in the second memory area of the stack, a memory area comprising the pointer address of the pointer element, in a second stack program object identifying step;

determining a second stack address offset in a second stack address offset determining step, wherein the second stack address offset is determined by a difference between the first stack address offset and a first relative memory address of the second stack program object;

determining a data type of the superordinate second stack program object in a second stack data type determining step, wherein the data type determines a data structure of the superordinate second stack program object in which a number of subordinate stack partial program objects of the superordinate second stack program object are defined and a memory size and a memory location within the data structure of the superordinate second program object are determined for each subordinate stack partial program object; and identifying a subordinate stack partial program object of the superordinate second stack program object that, according to the data structure of the superordinate second stack program object, is spaced apart from a first memory location of the superordinate second stack program object by the second address offset and identifying the subordinate stack partial program object of the superordinate second stack program object as the first stack program object, the memory address of which corresponds to the pointer address of the pointer element.

This provides the technical advantage of providing a fully qualified designation for a pointer object that is a subordinate partial object of a superordinate program object stored in the stack. For example, the pointer object referenced by the pointer element may be an element of a field type stored in the stack, a component of a compound type stored in the stack, or an element of a string type stored in the stack. The fully qualified designation of the pointer object may in this case include the designation of the superordinate stack program object and the designation of the subordinate stack partial program object. A determination of the fully qualified designation of the pointer element is here carried out analogously to the procedure described above for determining a fully qualified designation of a pointer element with single nesting depth stored in the program state.

According to an embodiment, a stack program object of the stack is embodied as a superordinate third stack program object, wherein the superordinate third stack program object comprises at least one subordinate stack partial program object, wherein the superordinate second stack program object is comprised as a subordinate stack partial program object by the superordinate third stack program object, and wherein the second stack program object identifying step comprises:
- identifying, as the superordinate third stack program object, a program object of the stack for which, according to the respective memory location and memory size, a memory area is defined comprising a memory location spaced apart from the first memory address of the stack by the first stack address offset, and identifying the superordinate third stack program object as the program object occupying, in the second memory area of the stack, a memory area comprising the pointer address of the pointer element, in a third stack program object identifying step;
- determining a third stack address offset in a third stack address offset determining step, wherein the third stack address offset is determined by a difference between the first stack address offset and a first relative memory address of the third stack program object;
- determining a data type of the superordinate third stack program object in a third stack data type determining step, wherein the data type determines a data structure of the superordinate third stack program object in which a number of subordinate stack partial program objects of the superordinate third stack program object are defined and a memory size and a memory location within the data structure of the superordinate third stack program object are determined for each subordinate stack partial program object; and
- identifying a subordinate stack partial program object of the superordinate third stack program object that is spaced apart from a first memory location of the superordinate third stack program object by the third stack address offset according to the data structure of the superordinate third stack program object, and identifying the subordinate stack partial program object of the superordinate third stack program object as the superordinate second stack program object that occupies a memory area in the second memory area of the stack that comprises the pointer address of the pointer element;
- wherein the second stack address offset is determined by a difference between the first stack address offset and a sum of the first relative memory address of the third program object and the first relative memory address of the second stack program object.

This provides the technical advantage of providing a fully qualified designation of a pointer object stored in the stack that is a subordinate object of a double nesting depth stack program object stored in the stack. The qualified designation is determined analogously to the method described above for determining a qualified designation of a pointer object stored in the program state and formed as a partial object of a superordinate program object of double nesting depth.

According to an embodiment, a stack program object of the stack is embodied as a superordinate n-th stack program object, wherein the superordinate n-th stack program object comprises subordinate stack partial program objects comprising one another at n−1 nesting depth, wherein the superordinate second stack program object is comprised as a subordinate stack partial program object at n−2 nesting depth by the superordinate n-th stack program object, wherein the first stack program object is comprised as a subordinate stack partial program object at n−1th nesting depth by the superordinate n-th stack program object, where n is a natural number and larger than or equal to 4, and wherein the second stack program object identifying step comprises:
- identifying a program object of the stack for which, according to the respective memory location and memory size, a memory area is defined comprising a memory location spaced apart from the first memory location of the stack by the first stack address offset, as the superordinate n-th stack program object, and identifying the superordinate n-th stack program object as the program object occupying, in the second memory area of the stack, a memory area comprising the pointer address of the pointer element, in an n-th stack program object identifying step;
- determining an n-th stack address offset in an n-th stack address offset determining step, wherein the n-th stack address offset is determined by a difference between the first stack address offset and a first relative memory address of the n-th stack program object;
- determining a data type of the superordinate n-th stack program object in an n-th stack data type determining step, wherein the data type determines a data structure of the superordinate n-th stack program object in which a number of subordinate stack partial program objects of the superordinate n-th stack program object are defined and a memory size and a memory location within the data structure of the superordinate n-th stack program object are determined for each subordinate stack partial program object;
- identifying a subordinate stack partial program object of the superordinate n-th stack program object that is spaced apart from a first memory location of the superordinate n-th stack program object by the n-th stack address offset according to the data structure of the superordinate n-th stack program object, and identifying the subordinate stack partial program object of the superordinate n-th stack program object as a superordinate n−1th stack program object occupying a memory location in the second memory location of the stack comprising the pointer address of the pointer element, in an n−1th stack program object identifying step;
- determining an n−1th stack address offset in an n−1th stack address offset determining step, wherein the n−1th stack address offset is determined by a difference between the first stack address offset and a sum of the first relative memory address of the n-th stack program object and a first relative memory address of the n−1th stack program object;
- determining a data type of the superordinate n−1th stack program object in an
- n−1th stack data type determining step, wherein the data type determines a data structure of the superordinate n−1th stack program object in which a number of subordinate stack partial program objects of the superordinate n−1th stack program object are defined and a memory size and a memory location within the data structure of the superordinate n−1th stack program object are determined for each subordinate stack partial program object; and identifying a subordinate stack partial program object of the superordinate n−1th stack program object that is spaced apart from a first memory location of the superordinate n−1th stack program object by the n−1th stack address offset according to the data structure of the superordinate n−1th stack program object, and identifying the subordinate stack partial program object of the superordinate n−1th stack program object as a superordinate n−2th stack program object occupying a memory location in the second memory location of the program state comprising the pointer address of the pointer element in an n−2th stack program object identifying step;

if n−2>2 applies, recursively executing the n−1th stack address offset determining step and the n−2th stack program object identifying step in another recursion step; and determining a second stack address offset in a second stack address offset determining step, wherein the second stack address offset is determined by a difference between the first stack address offset and a sum of first relative memory addresses of the n-th stack program object to second stack program object;

determining a data type of the superordinate second stack program object in a second stack data type determining step, wherein the data type determines a data structure of the superordinate second stack program object in which a number of subordinate stack partial program objects of the superordinate second stack program object are defined and a memory size and a memory location within the data structure of the superordinate second stack program object are determined for each subordinate stack partial program object; and identifying a subordinate stack partial program object of the superordinate second stack program object that is spaced apart from a first memory location of the superordinate second stack program object by the second address offset according to the data structure of the superordinate second stack program object, and identifying the subordinate stack partial program object of the superordinate second stack program object as the first stack program object, the memory address of which corresponds to the pointer address of the pointer element.

This achieves the technical advantage of providing a qualified designation of a pointer element stored in the stack, that is a sub-element of a superordinate stack program object of n-th nesting depth stored in the stack. Determining the fully qualified designation of the pointer element stored in the stack and embodied as a sub-object of a superordinate stack program object of n-th nesting depth is carried out analogously to the method described above for determining a fully qualified designation of a pointer object stored in the program state and embodied as a sub-object of a superordinate program object of n-th nesting depth.

According to an embodiment, the method further comprises:
determining a data type of the first program object in a first data type determining step, wherein the data type of the first program object determines a data structure of the first program object; and/or
determining a data type of the first stack program object in a first stack data type determining step, wherein the data type of the first program object determines a data structure of the first program object.

This achieves the technical advantage that the fully qualified designation of the pointer object stored in the program state or in the stack may comprise the data type of the pointer object. As a result, the information content on the pointer object provided by the fully qualified designation of the pointer object may be increased.

According to an embodiment, the fully qualified designation of the pointer object referenced by the pointer element comprises the designations of first program object and/or superordinate program objects or the designations of first stack program object and/or superordinate stack program objects and/or identified frame and/or a name of the identified function.

This has the technical advantage that a comprehensive fully qualified designation of the referenced pointer object may be provided, which comprises any information relating to the referenced pointer object, in particular with regard to any relations to superordinate program objects of the pointer object, including a nesting depth and corresponding data types or, as the case may be, names of functions of the pointer objects. Thus, the user may be provided with comprehensive information about the pointer object referenced by the pointer element.

According to an embodiment, a superordinate program object or a superordinate stack program object is of a compound type, a field type, or of a string type.

This achieves the technical advantage that a fully qualified designation of a pointer element may be provided for different data types. This allows for a broad applicability of the method according to the application.

According to an embodiment, the method further comprises:
selecting a plurality of program objects of the program state in a selecting step, wherein a selected program object is the pointer element;
determining fully qualified designations of the selected program objects in the full designation determining step; and
displaying the fully qualified designations of the selected program objects on the display element connected to the controller in the displaying step.

This achieves the technical advantage that a selection option may be provided for the program objects of the program state for which a fully qualified designation is to be determined and displayed in the display element. The user is thus in a position to select the program objects of the program state which are of interest during the execution of the control program and to determine a fully qualified designation according to the method steps described above for the selected program objects and to have it displayed during the execution of the control program. The user is thus able to individually select the program objects and have a fully qualified designation and corresponding values of the program objects displayed that are of interest for an evaluation of the automation process or the executed control program.

According to an embodiment, the displaying step displays a value of the respective program object in addition to the fully qualified designation, the method further comprising:
adjusting at least one value of a program object in an adjusting step; and
controlling an automation process by the control program taking into account the at least one changed value of the at least one program object in a controlling step.

This achieves the technical advantage that a controller of an automation process of the automation system may be adapted and modified on the basis of the displayed information of the program objects, in particular on the basis of the displayed fully qualified designations and the corresponding values of the program objects. The displayed fully qualified designations of the program objects in connection with the corresponding values of the program objects enable the user to immediately assess the state of the automation process to be controlled and, as the case may be, to make appropriate adjustments if the user determines that values of program objects or of parameters of the automation process do not correspond to the desired values. This allows for an immediate adjustment of the automation process, which results in an improved and more precise control of the automation process or the automation system. By specifying the fully qualified designations in combination with the values of the respective program objects, the user may immediately determine for which program objects a change of the values must be made in order to achieve a specific adaptation or modification of the automation process.

According to an embodiment, the method may be carried out in a debugging process and/or in a control process of the automation system.

This achieves the technical advantage that a broad applicability of the method according to the application may be provided. The method according to the application may be carried out during the execution of the control program for controlling the automation process, so that during the control of the automation process any program objects and corresponding values of the respective program objects may be displayed to the user. Hereby, a tracking of the controlled automation process may be enabled, which allows a monitoring of the automation process and, as the case may be, faulty courses of the automation process may be determined and eliminated.

Alternatively, the method according to the application may be carried out during a debugging process in which a functional capability of the control program is checked. For this purpose, the user may have various program objects of the control program displayed in order to determine a functional capability of the executed control program on the basis of the displayed values of the program objects.

According to an embodiment, the display element is embodied as a human-machine interface and is integrated into the control system.

This achieves the technical advantage that an as comfortable as possible representation of the qualified designations of the program objects of the program state of the control program is made possible. A user may have the corresponding program objects with the associated values displayed directly at the control of the automation system, in particular during the control of an automation process by the control program.

An automation system comprising a controller and a display element connected to the controller is provided, wherein the controller is embodied to perform the method according to the application.

This achieves, the technical advantage that an automation system is provided which is set up to carry out the method according to the application with the technical advantages mentioned above.

FIG. 1 shows a schematic diagram of an automation system 200 according to an embodiment.

In FIG. 1, an automation system 200 is shown having a controller 201 connected to automation devices 203 via a bus system 205. The controller 201 includes a memory SP comprising a first memory area SP1 and a second memory area SP2. In the first memory area SP1, a program state PZ of a control program of the controller is stored. A stack ST is stored in the second memory area SP2. The automation system 200 further comprises a display element 207 that is connected to the controller 201 in the embodiment shown in FIG. 1.

The depicted automation system 200 may be any automation system, and the automation devices 203 may be any sensors and actuators used to perform an automation process.

In particular, the automation process may be controlled by cyclically executing a control program by the controller 201.

The automation system 200 shown in FIG. 1 is merely exemplary and is not intended to be a limitation of the present invention. Various modifications may be carried out with regard to the embodiment of the automation system 200 shown in FIG. 1, all of which are comprised by the protective scope of the present invention.

Figure 2:
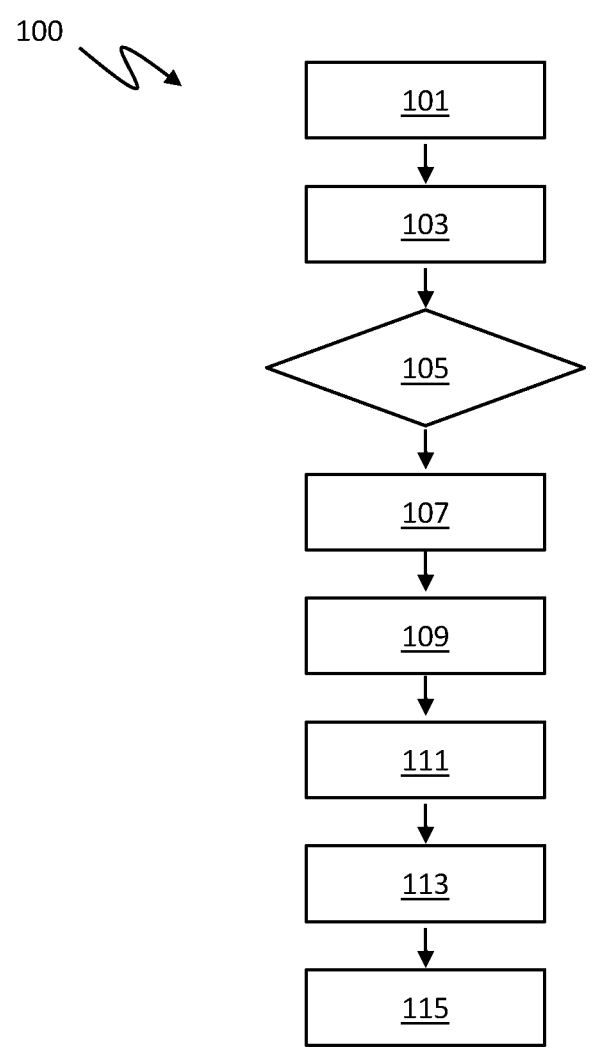
FIG. 2 is a flowchart of a method for controlling an automation system having visualization of program objects of a control program according to an embodiment.

FIG. 2 shows a flowchart of a method 100 for controlling an automation system 200 having visualization of program objects of a control program according to an embodiment.

The embodiment of the method 100 shown in FIG. 2 is described with reference to FIG. 4.

The embodiment of the method 100 shown in FIG. 2 is applicable to an automation system 200 according to the embodiment shown in FIG. 1.

In particular, the method 100 is applicable to an automation system 200 comprising a controller 201 with a control program stored in a memory SP, wherein a program state PZ of the control program is stored in a first memory area SP1 of the controller 201, wherein the program state PZ comprises a plurality of program objects of the control program, wherein the program objects PO are arranged relative to one another in a predetermined arrangement structure of the program state PZ, wherein each program object PO is assigned a memory position P and a memory size SG via the arrangement structure, a memory position P of a program object PO defining a number of memory locations by which a program object PO is stored in a memory area at a distance from a first memory location of the program state PZ, a memory size SG of a program object PO defining a number of memory locations occupied by a memory object in a memory area, the program state PZ comprising at least one pointer element, a pointer object ZO being referenced by the pointer element, the pointer object ZO being a program object PO of the control program, a stack of the control program being set up in a second memory area SP2 of the controller, and program objects PO being storable in the stack during a runtime of the control program.

In order to execute the method 100, the control program is first executed on the controller 201 of the automation system 200 in an executing step 101. The control program may be executed in the executing step 101 to control an automation process of the automation system 200. In this context, a control process is executed based on the control program by controlling the automation devices 203 according to the control program. Alternatively, the control program may be executed in the executing step 101 to perform a debugging process in which a functionality of the control program is traced or checked.

By executing the control program, values are assigned to the individual program objects of the control program, which are stored in the program state and which reflect an execution state of the control program or a state of the controlled automation process of the automation system

200. The values of the individual program objects may be based on measured values of sensor elements of the automation system 200.

In order to control the automation process, measured values are thus first recorded by sensors of the automation system 200. On the basis of these measured values, corresponding control values are determined by executing the control program, which are used to control corresponding actuators of the automation system 200 to control the automation process. The determined control values may be stored as values of corresponding program objects of the control program in the program state. Additionally, measured values of the sensor elements may be stored as values of corresponding program objects in the program state. In addition, values based on intermediate results of the execution of the control program and required for further executing the control program may be stored as corresponding values of corresponding program objects in the program state.

In a pointer address determining step 103, a pointer address ZA of a pointer element is determined. The pointer address ZA corresponds to a memory address referenced by the pointer element within the memory SP of the controller 201. The pointer element may be a program object of the control program and stored in the program state PZ of the control program. In order to determine the pointer address ZA, this may be read out as a value of the pointer element.

In a checking step 105, a check is carried out as to whether the pointer address ZA is arranged in a first memory area SP1 of the program state PZ. Depending on which program object is referenced by the pointer element, the pointer address may be arranged in different areas of the memory SP. The division of memory SP into the first and second memory areas is known, so that an assignment of the pointer address to one of the two memory areas is possible.

If the pointer address ZA is located in the first memory area SP1 of the program state PZ, a first address offset AO1 is determined in a first address offset determining step 107. The first address offset AO1 here describes a number of memory locations by which the pointer address ZA is spaced apart from a first memory address SPZ of the program state PZ.

The fact that the pointer address ZA is arranged in the first memory area SP1 means that a program object within the program state PZ is referenced by the pointer element. An arrangement of the pointer address ZA in the second memory area, on the other hand, means that a program object PO within the stack is referenced by the pointer element.

The first address offset AO1 may thus be seen as a difference between the pointer address ZA of the pointer element and the first memory address SPZ of the program state PZ in the first memory area SP1 of the memory SP. Via the first address offset AO1, the pointer address ZA, which is an absolute memory address within the memory SP, may be expressed as a relative memory address within the first memory area SP1 occupied by the program state PZ, which describes an addressing relative to a first memory address SPZ of the program state PZ. The relative address may be defined by a distance from the first memory address SPZ of the program state PZ.

In a first program object identifying step 109, a program object PO of the program state PZ is identified that is spaced apart from the first memory address SPZ of the program state PZ by the number of memory locations defined by the first address offset AO1. Furthermore, since the pointer address ZA is also spaced apart from the first memory address SPZ of the program state PZ by the first address offset AO1, the identified program object PO is identified as a first program object PO1 having a memory address in the first memory area SP1 of the program state PZ that is identical to the pointer address ZA of the pointer element.

Via the arrangement structure of the program state PZ, each program object PO of the program state PZ is assigned a memory position P and a memory size SG, the memory size SG defining a number of memory locations occupied by the respective program object PO in the respective memory area. On the basis of the respective memory positions P and memory sizes SG of the individual program objects PO, a distance to the first memory address SPZ of the program state PZ may be determined for each of the program objects PO stored successively in the first memory area SP1 of the program state PZ. The distance describes in each case a number of memory locations by which a first memory address of the respective program object is in the memory SP spaced apart from the first memory address SPZ of the program state. That program object PO the distance of which from the first memory address SPZ of the program state PZ corresponds to the first address offset AO1 is identified as the first program object PO1. Since the distance of the first program object PO1 to the first memory location SPZ of the program state PZ corresponds to the first address offset AO1, the first program object PO1 is stored at a memory address corresponding to the pointer address ZA. Thus, the identified first program object PO is referenced by the pointer element.

Thus, in a pointer object identifying step 111, the identified first program object PO1 is identified as the pointer object ZO referenced by the pointer element. This uniquely assigns a program object PO of the program state PZ to the pointer address ZA of the pointer element.

Subsequently, in a full designation determining step 113, the pointer object ZO represented by the first program object PO1 is assigned a fully qualified designation. The fully qualified designation of the pointer object ZO is represented here by at least the name or the designation of the identified first program object PO1 of the program state PZ. The name of the identified first program object PO1 may be a name defined in the control program of the variable represented by the first program object PO1 or of the represented data object.

Subsequently, the fully qualified designation of the pointer object ZO may be displayed in a displaying step 115 on a display element of the automation system 200. The display element 207 is connected to the controller 201 for this purpose. The display element 207 may e.g. be a desktop computer, a laptop computer, or a mobile device. Alternatively, the display element 207 may be integrated into the controller 201 as a human-machine interface.

In addition to the specific pointer objects ZO, fully qualified designations of a plurality of program objects PO may be displayed in the displaying step. The respective program objects PO do not have to be pointer objects ZO referenced by a pointer element and may be any variables of the control program or parameters of the automation process to be controlled.

By displaying the fully qualified designations of the program objects PO of the program state PZ, the user may be provided with directly readable information regarding the values of the program objects PO of the program state PZ. Apart from the fully qualified designations of the individual program objects PO, the display element 207 may display for each displayed program object PO the respective value of the program object that it has during the execution of the control program. During the control of an automation process of the automation system 200 based on the execution of the control program, an evaluation of a sequence of the automation process is thus enabled based on the values of the program objects.

Thus, based on the displayed fully qualified designations of the program objects PO on the display element 207, an evaluation of the control program and the automation process of the automation system 200 controlled by the control program may be carried out. Furthermore, according to the displayed fully qualified designations, modification of the control program may be made and control of the automation system 200 may be effected based on the modified control program.

Alternatively, on the basis of the displayed values and the fully qualified designations of the program objects, the automation process may be embodied or modified via an input of correspondingly changed control parameters. In this context, control parameters are parameter values on the basis of which the automation process may be controlled.

Figure 3:
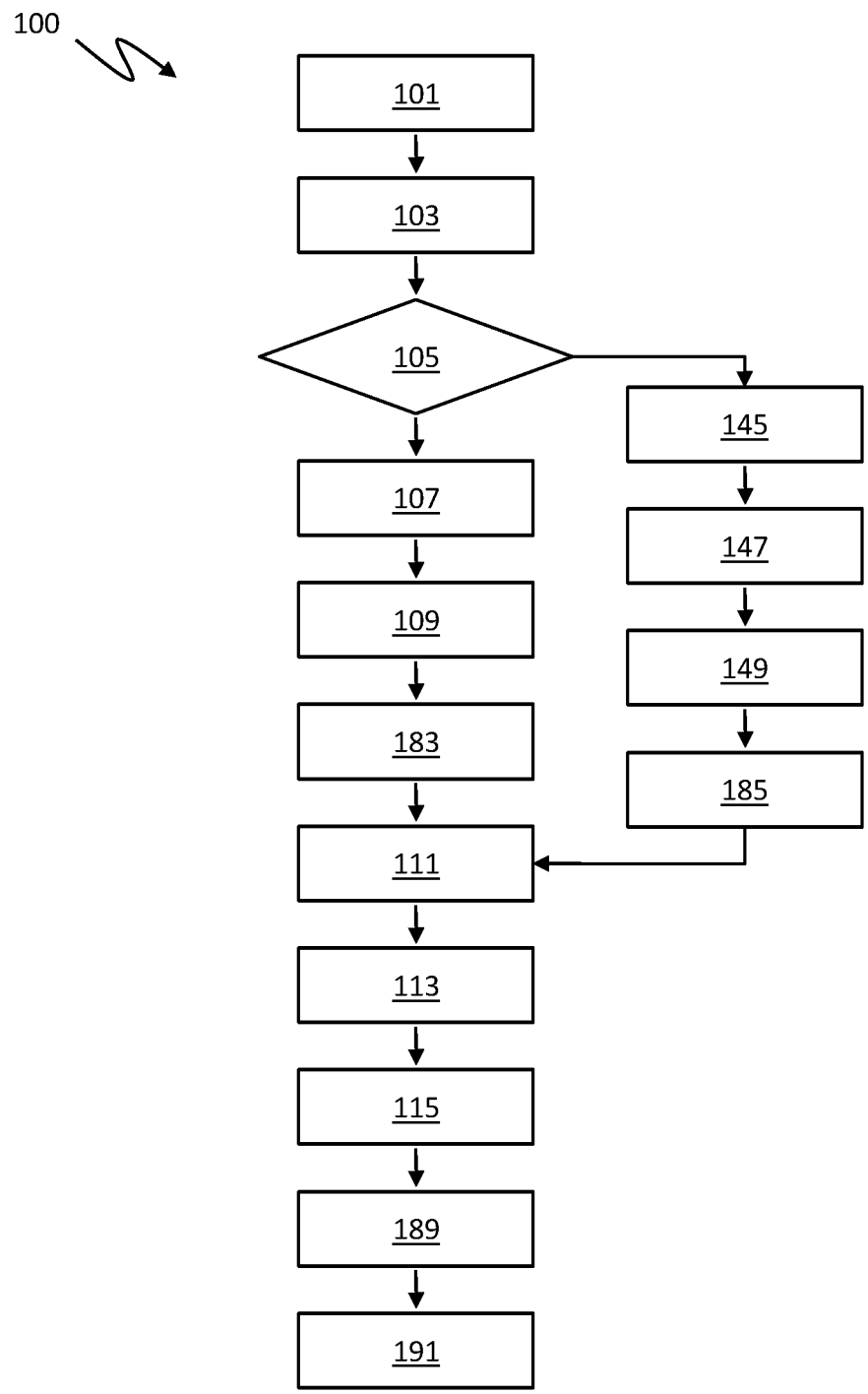
FIG. 3 is a further flowchart of the method for controlling an automation system having visualization of program objects of a control program according to a further embodiment.

FIG. 3 shows another flowchart of the method 100 for controlling an automation system 200 having visualization of program objects of a control program according to another embodiment.

The embodiment in FIG. 3 is based on the embodiment in FIG. 2 and comprises all the method steps shown there. Insofar as these remain unchanged in the embodiment in FIG. 3, a new description is dispensed with.

Deviating from the embodiment in FIG. 2, the method 100 in the embodiment in FIG. 3 comprises an adjusting step 189 and a controlling step 191.

In the adjusting step, adjustments are made to the values of program objects based on the fully qualified designations of program objects of the control program displayed in displaying step 115. For this purpose, values of the respective program objects PO are displayed in displaying step 115 in addition to the fully qualified designations of the program objects. Based on the fully qualified designations and the values of the program objects, an assessment of the automation process of the automation system 200 controlled by the control program may be carried out. On the basis of the evaluation, values of the program objects PO may be embodied or changed in order to realign the automation process or to adapt it to changed conditions. The adaptation of the values of the program objects PO may here depend on the type of the respective program object PO and the respective automation process to be controlled. The program objects PO the fully qualified designations of which are displayed in displaying step 115 and the values of which are embodied in adjusting step 189 may be any program objects PO of the control program and are not restricted to pointer objects ZO referenced by pointer elements.

In the controlling step 191, the automation process is then controlled on the basis of the embodied or modified values of the program objects PO. In this case, controlling comprises the activation of corresponding actuators of the automation system 200 via corresponding control commands based on the control program. Controlling also comprises recording measured values of the sensors of the automation system 200 and processing the sensor values as input values of the controller by executing the control program and generating corresponding control commands for the actuators in the form of output values of the controller.

Deviating from the embodiment shown in FIG. 2, the method 100 in the embodiment shown in FIG. 3 further comprises a first data type determining step 183 carried out after the first program object identifying step 109. In the first data type determining step 183, the data type of the identified first program object PO1 is determined. The data type of the first program object PO1 may subsequently be included in the fully qualified designation of the pointer object ZO in the full designation determining step 113 as additional information besides the name or designation of the program object.

Regardless of whether the first program object PO1 is located in the program state PZ or in the stack, it may be of any data type, such as an integer type, a float type, a Boolean type, or any other scalar type. Alternatively, the first program object may be of a compound type, a field type, or of a character string type. Alternatively, the first program object may be of a pointer type.

Furthermore, the embodiment in FIG. 3 comprises the case in which it is determined in the checking step 105 that the pointer address ZA of the pointer element is stored in the second memory area SP2 of the stack ST.

In this case, a structure of the stack is determined in a stack structure determining step 145. The structure of the stack describes an arrangement of the individual stack program objects in analogy to the arrangement structure of the program state PZ and assigns to each stack program object of the stack ST a memory position and a memory size which the respective stack program object occupies in the structure of the stack.

In a first stack address offset determining step 147, a first stack address offset is determined that defines a number of memory locations by which the pointer address ZA is spaced apart from a first memory address of the stack in the second memory area SP2. This step is analogous to the first address offset determining step 107.

Subsequently, in a first stack program object identifying step 149, taking into account the structure of the stack and the first stack address offset, a first stack program object is identified that is spaced apart from the first memory address of the stack by the number of memory locations defined in the first stack address offset.

Analogously to the embodiment described above, distances to the first memory address of the stack are determined for each stack program object stored in the stack in accordance with the respective memory positions and memory sizes determined in the structure of the stack. The stack program object the distance of which from the first memory address of the stack corresponds to the number of memory locations determined in the first stack address offset is identified as the first stack program object having a memory address in the second memory area SP2 of the stack ST corresponding to the pointer address ZA of the pointer object.

In a first stack data type determining step 185, the data type of the identified first stack program object is determined.

In the pointer object identifying step 111, the identified first stack program object is identified with the pointer object ZO of the pointer element.

The determination of the first stack address offset in the first stack address offset determining step 147, as well as the determination of the first stack program object in the first stack program object identifying step 149 are carried out analogously to the corresponding method steps regarding the determination of the first address offset and the identification of the first program object of the program state PZ, respectively.

Figure 4:
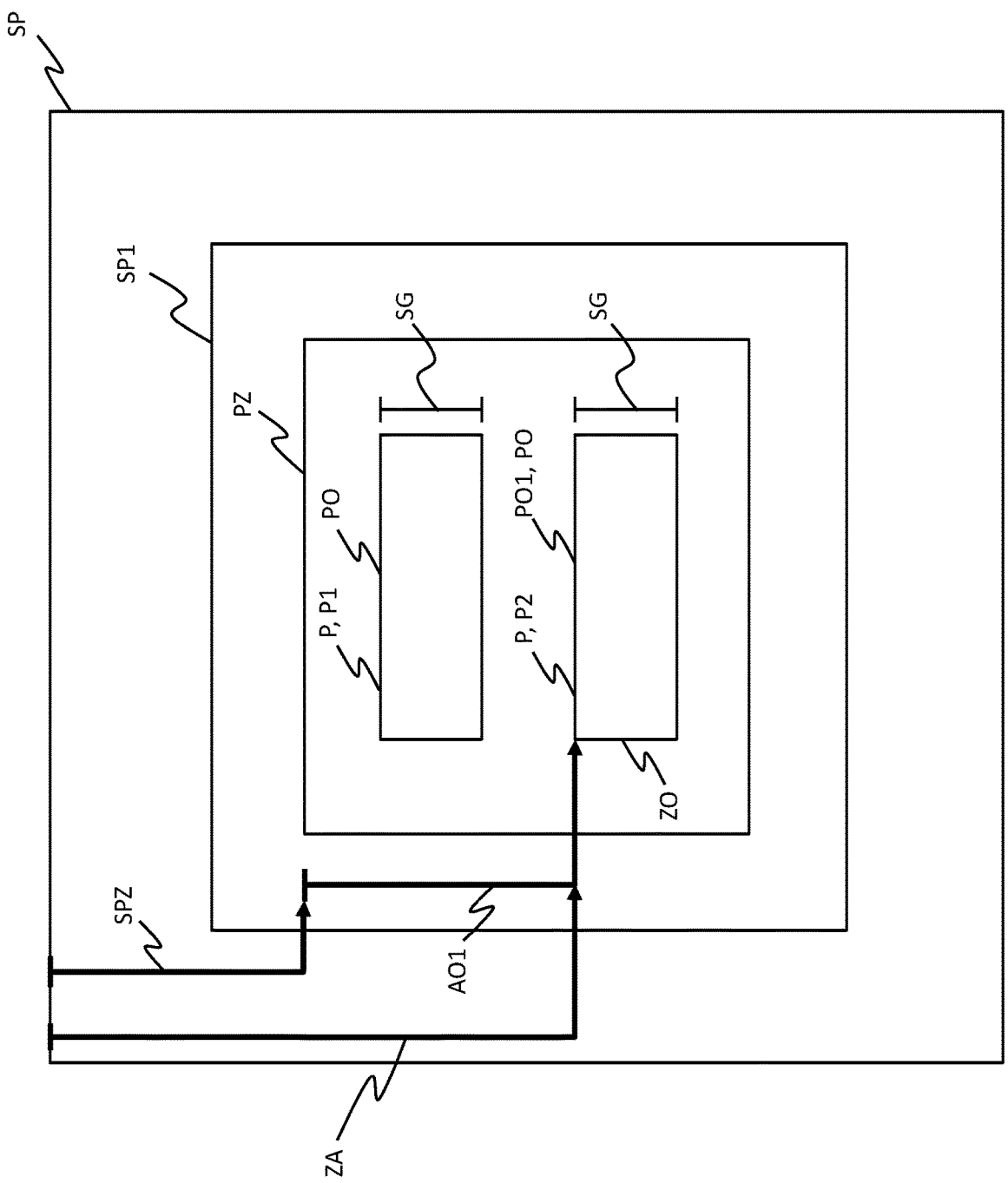
FIG. 4 is a schematic depiction of a determination of a pointer object according to an embodiment of the method in FIG. 2.

FIG. 4 shows a schematic diagram of a determination of a pointer object ZO according to an embodiment of the method 100 in FIG. 2.

FIG. 4 illustrates an arrangement of program objects PO of program state PZ within first memory area SP1 of memory SP of controller 201. FIG. 4 serves to illustrate the identification of the first program object PO1 as the pointer object ZO referenced by the pointer element, which is stored in the first memory area SP1 of the program state PZ at the pointer address ZA.

FIG. 4 shows the first memory area SP1 within the memory SP. In the first memory area SP1, the program state PZ is shown as a contiguous area within the first memory area SP1. In the embodiment shown in FIG. 4, the program state PZ comprises a first program object PO1 and a further program object PO. The size ratios shown in FIG. 4 are distorted for illustrative purposes. Furthermore, the program objects PO comprised by program state PZ are shown in a purely exemplary number. Both are for illustrative purposes only.

The program object PO is arranged within an arrangement structure of the program state PZ at a first memory position P1, while the first program object PO1 is arranged in a second memory position P2. Both program objects have a memory size SG that describes a number of memory locations that the respective program objects PO, PO1 occupy in the first memory area SP1 of the program state PZ. Alternatively, the memory sizes of the program object PO and the first program object PO1 may be different.

In the embodiment in FIG. 4, the first program object PO1 corresponds to the pointer object ZO and is stored in the first memory area SP1 of the program state PZ at a memory address that corresponds to the pointer address ZA of the pointer object ZO. The pointer address ZA corresponds to the absolute memory address within the address space of the memory SP.

In addition, FIG. 4 shows a first address offset AO1 that describes a distance between the pointer address ZA and a first memory address SPZ of the program state PZ. The first address offset AO1 thus describes a distance that the pointer address ZA has relative to a first memory address SPZ of the program state PZ.

The memory address ZA and in particular the memory address of the first program object PO1 may thus be expressed as a sum of the first memory address SPZ of the program state PZ and the first address offset AO1.

By determining the first address offset AO1 in the first address offset determining step 107, as the difference of the pointer address ZA to the first memory address SPZ of the program state PZ, and taking into account the arrangement structure of the program state PZ which assigns a memory location PO1, PO2 within the program state PZ and a memory size SG to each program object of the program state PZ, by counting the memory locations from the first memory address SPZ of the program state PZ which the individual program objects PO, PO1 of the program state PZ occupy within the first memory area SP1 of the program state PZ, that program object may be identified, in the embodiment in FIG. 4 the first program object PO1, which is spaced apart from the first memory address SPZ of the program state PZ by the first address offset AO1 and thus occupies a memory address within the first memory area SP1 of the program state PZ that corresponds to the pointer address ZA of the pointer object ZO. This allows the pointer object ZO to be identified in terms of an identified first program object PO1 of the program state PZ.

The procedure shown in FIG. 4 may be applied analogously to the identification of a corresponding stack program object of the stack for the case in which the pointer address ZA of the pointer object ZO is located in the stack.

Figure 5:
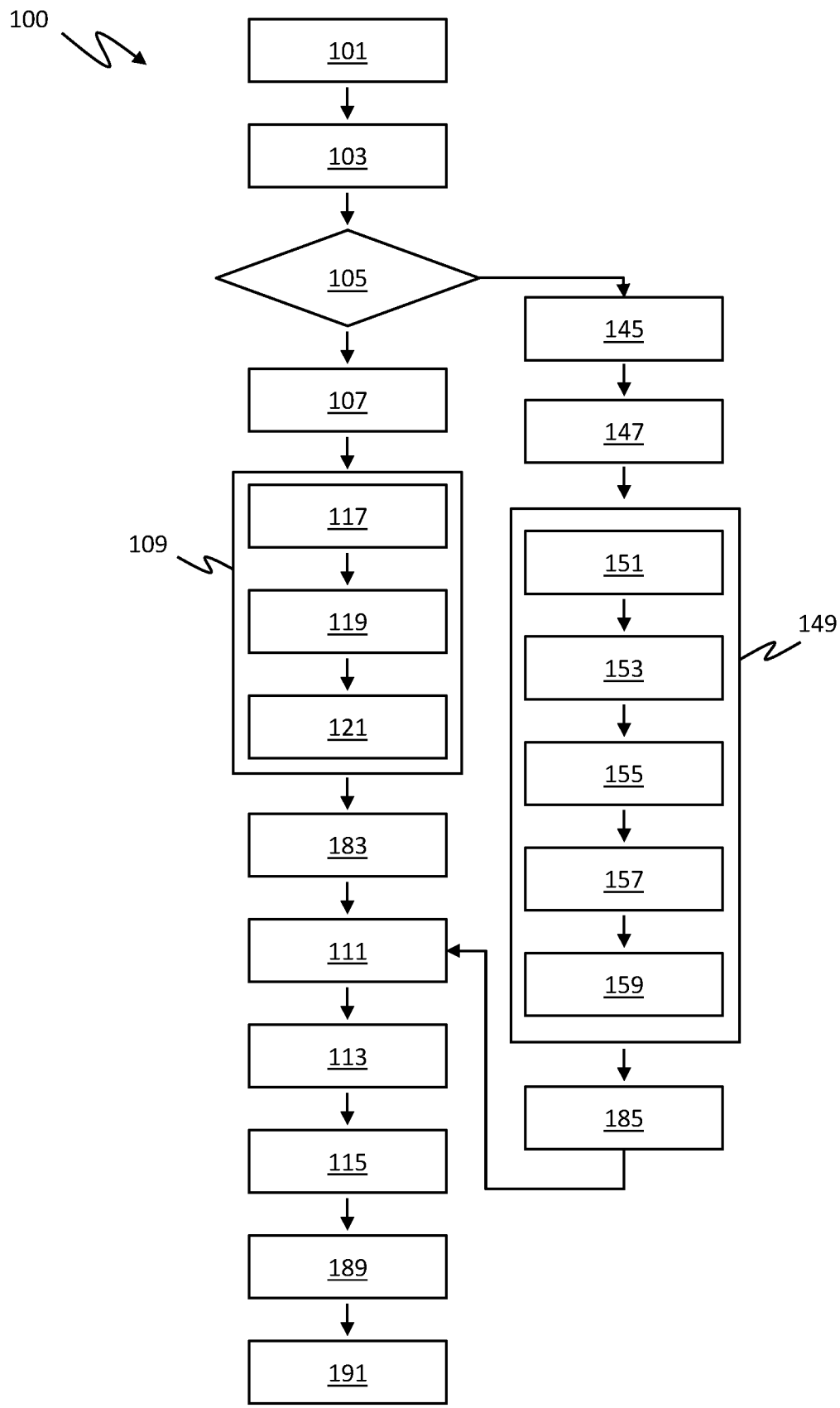
FIG. 5 is a further flowchart of the method for controlling an automation system having visualization of program objects of a control program according to a further embodiment.

FIG. 5 shows another flowchart of the method 100 for controlling an automation system 200 having visualization of program objects PO of a control program according to another embodiment.

The embodiment of the method 100 in FIG. 5 is described with reference to FIG. 7 and the description provided therefor.

The embodiment shown in FIG. 5 is based on the embodiment in FIG. 3 and comprises all the method steps described therein. Insofar as these remain unchanged in the embodiment in FIG. 5, a new description is dispensed with.

In the embodiment in FIG. 5, the case is described in which the first program object PO1 is a subordinate partial program object of a superordinate second program object PO2. The superordinate second program object PO2 may e.g. be of the data type of a compound type, a field type or a of character string type and the subordinate first program object PO1 may accordingly be, for example, an element of the field type, a component of the compound type or an element of the character string type.

In order to identify the first program object PO1, the first program object identifying step 109 thus comprises a second program object identifying step 117. In the second program object identifying step 117, taking into account the arrangement structure of the program state PZ and taking into account the first address offset AO1, a superordinate second program object PO2 is identified which occupies a memory area in the first memory area SP1 of the program state PZ which comprises the pointer address ZA. The superordinate second program object PO2 is identified here by identifying, in accordance with the arrangement structure of the program state PZ, the program object PO of the program state PZ that occupies a memory area in which the memory location spaced apart from the first memory address SPZ of the program state PZ by the first address offset AO1 is arranged.

The identification of the superordinate second program object PO2 is carried out in a similar way to the identification of the first program object PO1 described above by determining the distances of the individual program objects PO of the program state PZ from the first memory address SPZ of the program state PZ. The distance of a program object PO is in this context a number of memory locations by which a first relative memory address of the respective program object is arranged spaced apart from the first memory address SPZ of the program state PZ in the memory SP. That program object PO which, according to the arrangement structure of the program state PZ, occupies within the program state PZ an area comprising a memory location which is spaced apart from the first memory address SPZ of the program state PZ by the determined first address offset AO1 is identified as the superordinate second program object PO2.

Subsequently, in a second address offset determining step 119, a second address offset AO2 is determined which is a difference between the first address offset and the first relative memory address SPO2 of the second program object PO2, and which defines a number of memory locations by which the pointer address ZA is spaced apart from a first relative memory address SPO2 of the superordinate second program object PO2.

In a second data type determining step 121, the data type of the superordinate second program object PO2 is determined. The data type of the superordinate program object PO2 comprises a number of subordinate partial program objects of the superordinate second program object PO2. In addition, the data type describes a structure in which the individual subordinate partial program objects are arranged in the superordinate second program object PO2. In this context, each subordinate part-program object is assigned a memory position and a memory size within the memory area occupied by the superordinate second program object PO2. The memory positions are determined in each case relative to the first memory location of the second program object PO2.

Subsequently, taking into account the second address offset AO2 and the structure of the superordinate second program object PO2, the subordinate partial program object of the superordinate second program object PO2 is determined which is spaced apart from the first relative memory address SPO2 of the superordinate second program object PO2 by the second address offset AO2. This identified subordinate partial program object is identified as the first program object PO1 located within the program state PZ of the first memory area SP1 at a memory address corresponding to the pointer address ZA of the pointer object ZO.

The first program object PO1 is identified in an analogous or comparable manner to the identification of the superordinate second program object PO2 in that distances are determined for all subordinate partial program objects of the superordinate second program object PO2 in accordance with the respective memory positions and memory sizes by which the subordinate partial program objects are spaced apart from a first memory location of the superordinate second program object PO2. The subordinate partial program object the distance of which corresponds to the second address offset AO2 is identified as the first program object PO1, the memory address of which is spaced apart from the first memory address SPZ of the program state PZ by the first address offset AO1 and consequently corresponds to the pointer address ZA. Distances are, as already described above, numbers of memory locations by which the first relative memory addresses of the respective program objects PO are arranged with respect to a first relative memory address of the respective directly superordinate program object PO in memory SP.

The first address offset AO1 may in this context be expressed as a sum of the second address offset AO2 and the first relative memory address SPO2 of the superordinate second program object PO2 within the program state PZ.

In the fully qualified designation of the identified pointer object in the full designation determining step 113, both the designation of the identified first program object PO1 and the designation of the identified superordinate second program object PO2 may be specified. Thus, in a case in which an element of a field type or a component of a compound type or an element of a string type is referenced by the pointer element, the fully qualified designation may specify the referenced element or component and the corresponding field type, compound type, or character string type.

FIG. 5 also describes the case in which the pointer address ZA is located in the second memory area SP2 of the stack ST and a subordinate stack partial object of a superordinate stack program object is referenced by the pointer element. In analogy to what is described above, the case is described here in which an element or a component of a compound type, a field type or a character string type stored in the stack is referenced by the pointer element.

For this purpose, the first stack program object identifying step 149 comprises a frame identifying step 151. In the frame identifying step, a frame of the stack is identified that occupies memory addresses in the second memory area SP2 of the stack ST, one of which is spaced apart from the first memory address of the stack by the first stack address offset. For this purpose, based on a structure of the stack in which a memory position and memory size are assigned to each program object of the stack, the frame that occupies a memory area in the stack comprising the pointer address ZA may be determined.

The frames of the stack are usually arranged in a sequence. The content of a frame may therefore be used to infer the structure of a respectively subsequent frame. The structure of the first frame of the stack is usually known. In particular, the structure of a frame may be determined by the corresponding function of the frame. If necessary, an execution position of the function may also have to be taken into account to determine the structure of the frame.

A function identifying step 153 further identifies the associated function of the identified frame.

In a second stack program object identifying step 155, a superordinate second stack program object is identified that occupies memory addresses in the previously determined frame that are spaced apart from the first memory address of the frame.

The procedure in the second stack program object identifying step 155 is similar to that in the second program object identifying step 117.

In a second stack address offset determining step 157, a second stack address offset is determined based on a difference between the first stack address offset and the first relative memory address of the second stack program object PO2, and defines a number of memory locations by which the pointer address ZA is spaced apart from a first relative memory address of the superordinate second stack program object.

In a second stack data type determining step 159, a data type of the superordinate second stack program object is determined.

On the basis of the second stack address offset and the data type of the superordinate second stack program object defining an arrangement structure of the subordinate stack partial program objects of the superordinate second stack program object, the first stack program object is identified as the subordinate stack partial program object of the superordinate second stack program object spaced apart by the second stack address offset from the first relative memory address of the superordinate second stack program object.

The identification of the superordinate second stack program object, the determination of the second stack address offset, and the identification of the first stack program object are performed analogously to the procedure described above for determining the corresponding address offset and identifying the corresponding program object of the program state.

In analogy to what is described above, the fully qualified designation of the pointer object ZO may include both the designation of the referenced component or element and the designation of the superordinate field type, compound type, or character string type. In addition, the fully qualified designation of the pointer object ZO may comprise a designation of the frame comprising the pointer object ZO or of the function belonging to the frame.

Figure 6:
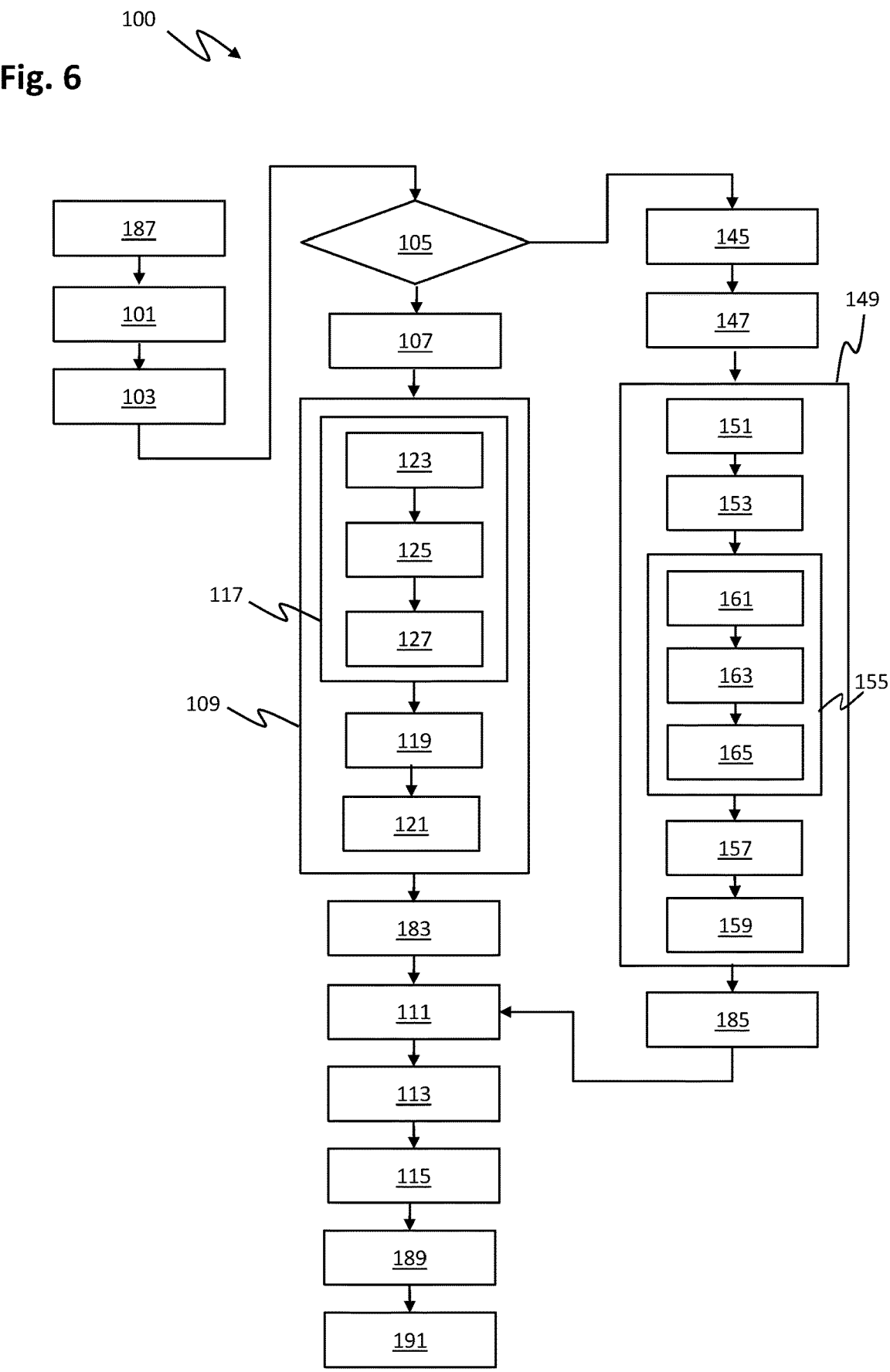
FIG. 6 is a further flowchart of the method for controlling an automation system having visualization of program objects of a control program according to a further embodiment.

FIG. 6 shows a further flowchart of the method 100 for controlling an automation system 200 having visualization of program objects PO of a control program according to a further embodiment.

The embodiment of the method 100 in FIG. 6 is described with reference to FIG. 7 and the description provided therefor.

The embodiment in FIG. 6 is based on the embodiment in FIG. 5 and comprises all the method steps described there.

Insofar as these remain unchanged in the embodiment in FIG. 6, a new description is dispensed with.

The embodiment in FIG. 6 describes the case in which the pointer object referenced by the pointer element is a subordinate partial program object of a superordinate program object in double nesting depth. FIG. 6 thus describes the case in which e.g. an element of an object of a field type is referenced by the pointer element, in which the field type object is in turn an element of a further object of a field type. Similarly, the pointer object may be a component of a compound type the object of which is in turn a component of a superordinate compound type. Similarly, field types, compound types and further types, also in combination, may be nested in each other arbitrarily, wherein the nesting depth is arbitrary.

For this purpose, in the embodiment shown in FIG. 6, the second program object identifying step 117 comprises a third program object identifying step 123 in which the superordinate third program object PO3 is identified as a program object PO of the program state PZ that occupies a memory area in which the pointer address ZA is located. The superordinate third program object PO3 comprises a plurality of subordinate partial program objects. One of the subordinate partial program objects is the superordinate second program object, which in turn comprises the first program object PO1.

The superordinate third program object PO3 is identified in the same way as the superordinate second program object PO2 described for FIG. 5.

In a third address offset determining step 125, a third address offset AO3 is determined. The third address offset AO3 describes the distance between the pointer address ZA, i.e. the address that is spaced apart from the first memory address SPZ of the program state PZ by the first address offset AO1, and a first relative memory address SPO3 of the superordinate third program object PO3. The determination is analogous to the determination of the second address offset AO2 described for FIG. 5.

The third address offset AO3 here describes a number of memory locations by which the pointer address ZA is spaced apart from a first relative memory address SPO3 of the superordinate second program object PO3.

The third address offset AO3 thus results from a difference between the first address offset AO1 and the first relative memory address SPO3 of the third program object PO3.

In a third data type determining step 127, the data type of the superordinate third program object PO3 is determined.

On the basis of the data type of the superordinate third program object PO3 and the third address offset AO3, in the second program object identifying step 117, after steps 123,125,127 have been carried out, the superordinate second program object PO2 is identified as the subordinate program sub-object of the superordinate third program object PO3 that comprises the pointer address ZA. The identification of the superordinate second program object PO2 is analogous to that described for FIG. 5 in the first program object identifying step 109 by determining the distances of the subordinate partial program objects of the superordinate third program object PO3 to the first memory location of the third program object PO3 and determining that subordinate partial program object of the superordinate third program object PO3, which, according to the determined distance and the respective memory size SG, occupies an area in the memory area of the superordinate third program object PO3 which comprises a memory address which is spaced apart from the first relative memory address SPO3 of the third program object PO3 by the third address offset AO3.

The identification of the superordinate second program object PO2 is thus based on the third address offset AO3 and the knowledge of the structure of the particular type of the third program object PO3 by which the arrangement of subordinate partial program objects of the third program object PO3 is defined. Accordingly, that subordinate partial program object of the third program object PO3 is determined as the second program object PO2 the memory area of which comprises a memory location that is spaced apart from the first relative memory location of the third program object PO3 by the third address offset AO3.

Similarly, to determine a superordinate third stack program object, a second stack program identifying step 155 performs a third stack program identifying step 161. Subsequently, in a third stack address offset determining step 163, a third stack address offset is determined by determining a distance between the pointer address ZA and a first relative memory address of the superordinate third stack program object. Subsequently, in a third stack data type determining step 165, the data type of the superordinate third stack program object is determined.

On the basis of this, the second stack program object identifying step 155 identifies the superordinate second stack program object.

The identification of the superordinate third stack program object or the determination of the third stack address offset or the data type of the superordinate third stack program object is performed analogously to the identification of the superordinate second stack program object or analogously to the determination of the second stack address offset or the data type of the second stack program object.

In analogy to the identification of the superordinate second program object PO2 in the second program object identifying step 117 described above, the second stack program object is identified based on the third stack address offset and the data type of the superordinate third stack program object in the second stack program object identifying step 155.

Deviating from the embodiment in FIG. 5, the method 100 in the embodiment in FIG. 6 comprises a selecting step 187 in which program objects of the program state PZ or stack program objects of the stack are selected for which a determination of a fully qualified designation and a display of the fully qualified designation are carried out according to the method of to the invention.

Figure 7:
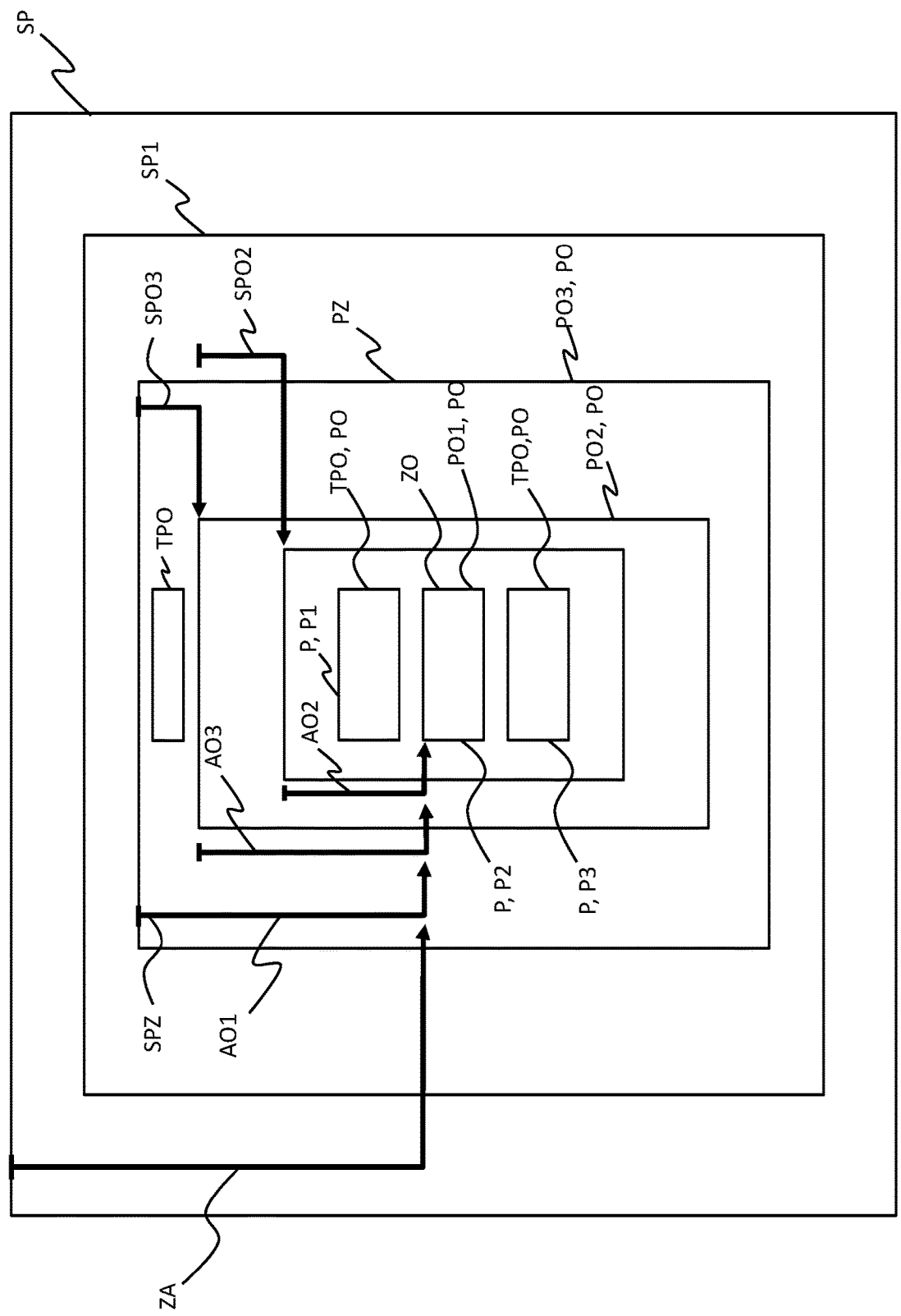
FIG. 7 is a schematic depiction of a determination of a pointer object according to an embodiment of the method in FIG. 6.

FIG. 7 shows a schematic diagram of a determination of a pointer object ZO according to an embodiment of the method 100 in FIG. 2.

The schematic depiction of the memory area of the program state PZ in FIG. 7 is based on the schematic representation in FIG. 4 and describes the case described for FIG. 6 in which the pointer object ZO referenced by the pointer element is a subordinate partial program object of a superordinate program object in double nesting depth.

For this purpose, in FIG. 7 the program state PZ is arranged in the first memory area SP1 of the memory SP, which in the embodiment in FIG. 7 comprises a program object PO and a further program object PO, which is embodied as a superordinate third program object PO3, which in turn comprises further subordinate partial program objects TPO. The superordinate third program object PO3 further comprises a subordinate partial program object in the form of the superordinate second program object PO2. The superordinate second program object PO2 in turn comprises three subordinate partial program objects TPO, of which one subordinate partial program object TPO is identified as the first program object PO1.

In analogy to FIG. 4, the first program object PO1 is identified as the pointer object ZO and is located in the first memory area SP1 of the program state PZ at the pointer address ZA.

Furthermore, a first address offset AO1 is shown in FIG. 7, which describes a distance between the pointer address ZA and the first memory address SPZ of the program state PZ. Furthermore, a second address offset AO2 is shown, which results from a difference between the first address offset AO1 and the first relative memory address SPO2 of the second program object PO2 and the first relative memory address SPO3 of the third program object PO3 and describes a distance between the first relative memory address SPO2 of the second program object PO2 and a memory location that is spaced apart from the first memory address SPZ of the program state PZ by the first address offset AO1.

Furthermore, a third address offset AO3 is shown, which results from a difference between the first address offset AO1 and the first relative memory address SPO3 of the third program object PO3 and describes a distance between the first relative memory address SPO3 of the third program object PO3 and a memory location that is spaced apart from the first memory address SPZ of the program state PZ by the first address offset AO1.

In order to identify a program object PO of the program state PZ as a pointer object ZO referenced by the pointer element, first the first address offset AO1 is determined, which describes the distance of the pointer address ZA to the first memory address SPZ of the program state PZ. Subsequently, based on the first address offset AO1 and an arrangement structure of the program state PZ, which assigns a memory position P and a memory size SG to each program object PO of the program state PZ, which itself is not a subordinate program object of a superordinate program object, identifies the superordinate third program object PO3 as the program object PO of the program state PZ which occupies, in the first memory area SP1 of the program state PZ, a memory area comprising a memory location which is spaced apart from the first memory address SPZ of the program state PZ by the first address offset AO1.

After identifying the superordinate third program object PO3, a third address offset AO3 is determined, which results from the difference between the first address offset AO1 and the first relative memory address SPO3 of the third program object PO3, and a number of memory locations is defined by which the pointer address ZA is spaced apart from the first relative memory address SPO3 of the superordinate third program object. Moreover, the data type of the superordinate third program object is determined, which in the embodiment in FIG. 7 states that the superordinate third program object PO3 comprises a subordinate partial program object in the form of the superordinate second program object PO2.

Subsequently, the superordinate second program object PO2 is identified as the subordinate partial program object of the superordinate third program object PO3, which in the memory area of the program state PZ occupies a memory area comprising memory locations spaced apart from the first relative memory location SPO3 of the superordinate third program object PO3 by the third address offset AO3.

Subsequently, a second address offset AO2 is determined, which results from the difference between the first address offset AO1 and a sum of the first relative memory address SPO3 of the third program object PO3 and the first relative memory address SPO2 of the second program object PO2, and which describes a number of memory locations by which the pointer address ZA is spaced apart from the first relative memory address SPO2 of the superordinate second program object PO2. Furthermore, the data type of the superordinate second program object PO2 is determined, which in the embodiment in FIG. 7 states that the superordinate second program object PO2 comprises three subordinate partial program objects TPO arranged in a first memory location P1, a second memory location P2, and a third memory location P3 within the memory area occupied by the superordinate second program object PO2. In FIG. 7, only the memory positions of the subordinate partial program objects of the superordinate second program object PO2 are provided with reference numerals. In addition to this, however, all other program objects PO of the program state PZ, including the superordinate third program object PO3 and the superordinate second program object PO2, have individually defined memory positions within the memory area of the program state PZ.

On the basis of the second address offset AO2 and the data structure of the data type of the superordinate second program object PO2, the first program object PO1 is identified below as the subordinate partial program object TPO of the superordinate second program object PO2, which is spaced apart from the first relative memory address SPO2 of the superordinate second program object PO2 by the second address offset AO2. Moreover, the first program object PO1 is consequently identified as the program object PO of the program state PZ stored in the first memory area SP1 at a memory address corresponding to the pointer address ZA of the pointer object ZO. Thus, the identified first program object PO1 is identified as the pointer object ZO.

The graphic depiction of the identification of the pointer object shown in FIG. 7 serves purely illustrative purposes to explain the procedure for identifying the individual nested program objects on the basis of the specific address offsets and the respective data structures or arrangement structures of the individual program objects or the program state PZ. The depiction of the memory area of the program state PZ illustrated in FIG. 7 is purely exemplary and is neither shown true to size nor does it represent a program state that would be expected in reality when executing a control program of an automation system.

The length of the arrows representing the address offsets and first relative memory addresses represent a number of memory locations by which a respective memory address to which the respective arrow points is spaced apart from the first memory address of the program state or a first relative address of a respective superordinate program object PO.

Figure 8:
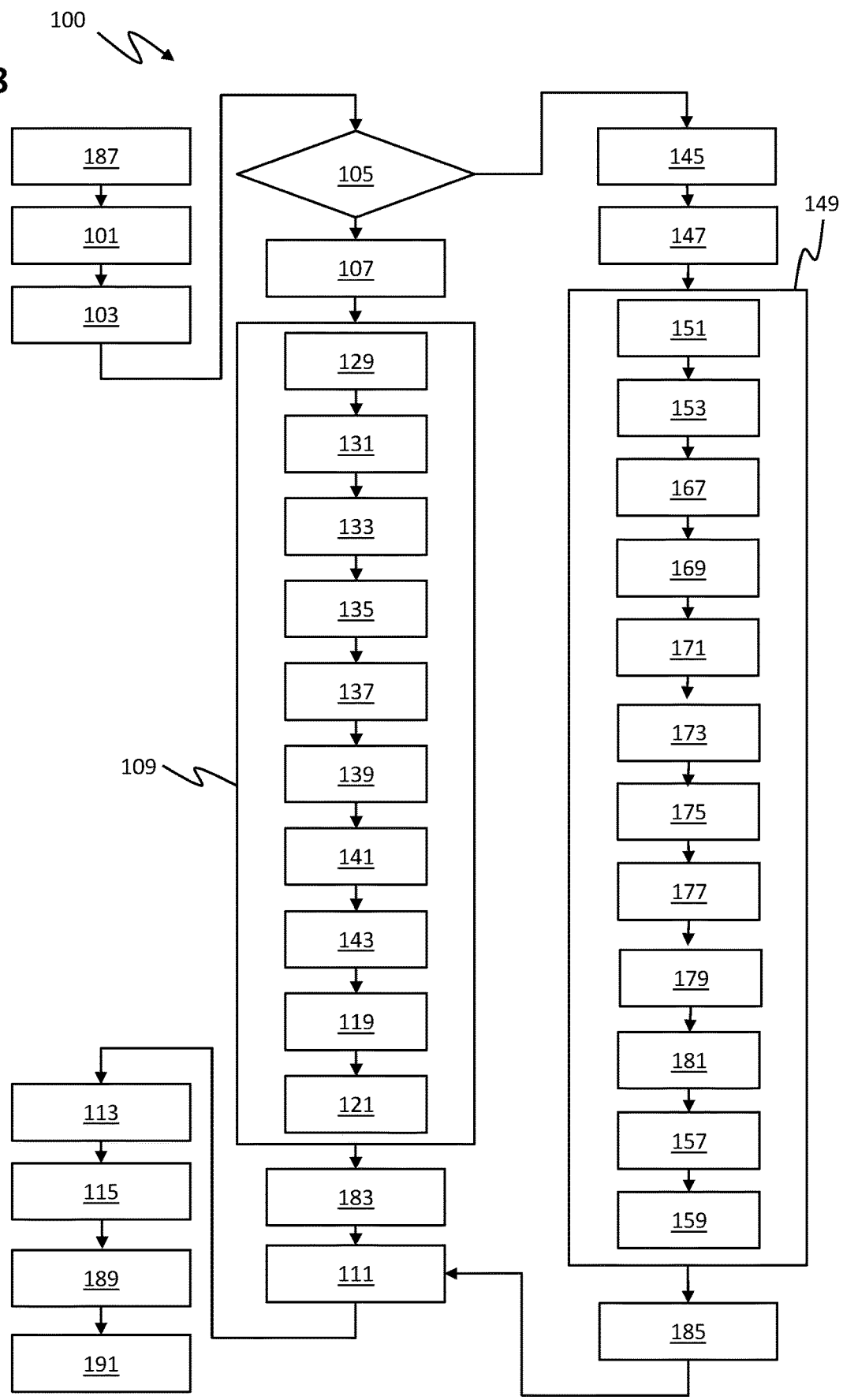
FIG. 8 is a further flowchart of the method for controlling an automation system having visualization of program objects of a control program according to a further embodiment.

FIG. 8 shows a further flowchart of the method 100 for controlling an automation system 200 having visualization of program objects PO of a control program according to a further embodiment.

The embodiment of the method 100 shown in FIG. 8 is based on the embodiment in FIG. 6 and comprises all the method steps described there. Insofar as these remain unchanged in the embodiment in FIG. 8, no further description is provided.

FIG. 8 illustrates the case in which the pointer element references a pointer object ZO that represents a subordinate partial program object of a superordinate program object PO of program state PZ with n-fold nesting depth. In the embodiment shown in FIG. 8, the recursive executability of the method 100 is illustrated in that, in order to identify a program object PO which is embodied as a subordinate partial program object of a superordinate program object PO with n-fold nesting depth, the method 100 may be applied recursively.

For this purpose, the first program object identifying step 109 comprises an n-th program object identifying step 129 in which a superordinate n-th program object is identified. Subsequently, in an n-th address offset determining step 131, an n-th address offset is determined, which is determined from a difference between the first address offset AO1 and the first relative memory address of the n-th program object. Furthermore, in an n-th data type determining step 133, the data type of the superordinate n-th program object is determined.

Subsequently, in an n−1th program object identifying step 135, a subordinate partial program object of the superordinate n-th program object that comprises an address spaced apart from a first relative memory address of the superordinate n-th program object by the n-th address offset is identified as a superordinate n−1th program object. Subsequently, an n−1th address offset is determined in an n−1th address offset determining step 137, which is determined by a difference between the first address offset AO1 and a sum of the first relative memory address of the n-th program object and the first relative memory address of the n−1th program object. In an n−1th data type determining step 139, the data type of the superordinate n−1th program object is then determined.

Based on this, in an n−2th program object identifying step 141, a subordinate partial program object of the superordinate n−1th program object is identified as a superordinate n−2th program object.

In the event that n−2 is larger than 2, the procedure is continued in a recursive manner until the superordinate second program object PO2 may be identified. Subsequently, in the second address offset determining step 119, the second address offset is determined and in the second data type determining step 121, the data type of the superordinate second program object PO2 is determined. In this embodiment, the second address offset AO2 results from a difference between the first address offset AO1 and a sum of the first relative memory addresses of the n-th to second program objects. On the basis of this, the first program object PO1 is identified as the program object stored in the first memory area SP1 of the program state PZ at a memory address corresponding to the pointer address ZA.

In the embodiment described here, the n-th program object has an n−1th nesting depth and comprises the n−1th program object. The n−1th program object in turn comprises an n−2th program object. This in turn comprises an n−3th program object. The series continues up to the second program object, which in turn comprises the first program object referenced by the pointer element. All the program objects mentioned may comprise further program objects in addition to those mentioned.

By recursively executing the above-mentioned steps, the program objects of corresponding nesting depth nested within the n program object are identified one after the other until the second program object and finally the first program object referenced by the pointer element are identified.

The same applies to the n-th stack program object, which also has an n−1 nesting depth and comprises nested stack program objects analogous to the one described above.

The procedure is analogous for the case in which the pointer element references a pointer object ZO, which is a subordinate partial program object of a superordinate program object of n-th nesting depth stored in the stack.

For this purpose, the first stack program object identifying step 149 comprises an n-th stack program object identifying step 167 in which the superordinate n-th stack program object is identified. Subsequently, in an n-th stack address offset determining step 169, the n-th stack address offset is determined. Subsequently, in an n-th stack data type determining step 171, the data type of the superordinate n-th stack program object is identified.

Subsequently, in an n−1th stack program object identifying step 173, a subordinate stack partial program object of the superordinate n-th stack program object is identified as a superordinate n−1th stack program object. Subsequently, an n−1th stack address offset is determined in an n−1th stack address offset determining step 175. Subsequently, the data type of the superordinate n−1th stack program object is determined in an n−1th stack data type determining step 177.

Subsequently, in a second stack program object identifying step 179, a subordinate stack partial program object of the superordinate n−1st stack program object is identified as a superordinate n−2th stack program object.

In the case in which it is true that n−2 is larger than 2, the method is recursively performed in a further recursion step 181 until a subordinate stack partial program object is identified as the superordinate second stack partial program object. Subsequently, in the second stack address offset determining step 157, the second stack address offset is determined. Subsequently, in the second stack data type determining step 159, the data type of the superordinate second stack program object is determined. Based on this, the first stack program object is finally identified as the stack program object stored in the second memory area of the stack at a memory address corresponding to the pointer address ZA of the pointer object.

In the full designation determining step 113, all designations of the superordinate program objects and/or stack program objects and the first program object and/or the first stack program object may subsequently be displayed, so that a complete nesting hierarchy of the individual program objects and/or stack program objects of the referenced pointer object are represented.

The execution of the individual program object identifying steps and stack program object identifying steps as well as the address offset determining steps and stack address offset determining steps and the data type determining steps and stack data type determining steps are carried out analogously to the embodiments described above. The embodiment in FIG. 8 differs from the embodiments described above only in the recursion depth of the method 100 carried out.

The present method 100 according to the application is recursively applicable to any nesting depth of the respective program objects PO of the program state PZ. Moreover, the program objects and stack program objects may be of a compound type, as well as of a field type or another type, and combinations of the aforementioned data types are possible, as well.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals 100 method
101 executing step
103 pointer address determining step TABLE 1-continued List of reference numerals

| | |
|---|---|
| 105 | checking step |
| 107 | first address offset determining step |
| 109 | first program object identifying step |
| 111 | pointer object identifying step |
| 113 | full designation determining step |
| 115 | displaying step |
| 117 | second program object identifying step |
| 119 | second address offset determining step |
| 121 | second data type determining step |
| 123 | third program object identifying step |
| 125 | third address offset determining step |
| 127 | third data type determining step |
| 129 | n-th program object identifying step |
| 131 | n-th address offset determining step |
| 133 | n-th data type determining step |
| 135 | n-1th program object identifying step |
| 137 | n-1th address offset determining step |
| 139 | n-1th data type determining step |
| 141 | n-2th program object identifying step |
| 143 | recursion step |
| 145 | stack structure determining step |
| 147 | first stack address offset determining step |
| 149 | first stack program object identifying step |
| 151 | frame identifying step |
| 153 | function identifying step |
| 155 | second stack program object identifying step |
| 157 | second stack address offset determining step |
| 159 | second stack data type determining step |
| 161 | third stack program object identifying step |
| 163 | third stack address offset determining step |
| 165 | third stack data type determining step |
| 167 | n-th stack program object identifying step |
| 169 | n-th stack address offset determining step |
| 171 | n-th stack data type determining step |
| 173 | n-1th stack program object identifying step |
| 175 | n-1th stack address offset determining step |
| 177 | n-1th stack data type determining step |
| 179 | n-2th stack program object identifying step |
| 181 | further recursion step |
| 183 | first data type determining step |
| 185 | first stack data type determining step |
| 187 | selecting step |
| 189 | adjusting step |
| 191 | controlling step |
| 200 | automation system |
| 201 | controller |
| 203 | automation devices |
| 205 | bus system |
| 207 | display |

TABLE 2

List of reference symbols

| | | | |
|---|---|---|---|
| AO1 | first address offset | SPZ | first memory address of program state |
| AO2 | second address offset | P | memory position |
| SPS | memory | P1 | first memory position |
| SP1 | first memory area | P2 | second memory position |
| SP2 | second memory area | P3 | third memory position |
| PZ | program state | SG | memory size |
| PO | program object | ST | stack |
| PO1 | first program object | ZO | pointer object |
| PO2 | superordinate second program object | ZA | pointer address |
| PO3 | superordinate third program object | | |
| TPO | subordinate partial program object | | |
| SPO2 | first relative memory address second program object | | |
| SPO3 | first relative memory address third program object | | |

The invention claimed is:

1. A method for controlling an automation system having visualization of program objects of a control program of an automation system,
wherein a controller of the automation system comprises a control program,
wherein a program state of the control program is stored in a first memory area of the controller, wherein the program state comprises a plurality of program objects of the control program, and wherein the program objects are arranged relative to one another in a predetermined arrangement structure of the program state,
wherein a memory position and a memory size are assigned to each program object via the arrangement structure, wherein a memory position of a program object defines a number of memory locations by which a program object in a memory area is stored spaced apart from a first memory location of the program state, and wherein a memory size of a program object defines a number of memory locations which a memory object occupies in a memory area,
wherein the program state comprises at least one pointer element, wherein a pointer object is referenced by the pointer element, and wherein the pointer object is a program object of the control program, and
wherein a stack of the control program is set up in a second memory area of the controller, wherein program objects are stored in the stack during a runtime of the control program;
the method comprising:
executing the control program in an executing step;
determining a pointer address of the pointer element in a pointer address determining step, wherein the pointer address corresponds to a memory address referenced by the pointer element; and
checking whether the pointer address of the pointer element is located in the first memory area of the program state or in the second memory area of the stack in a checking step;
if the pointer address of the pointer element is arranged in the first memory area of the program state, determining a first address offset of the pointer address of the pointer element in a first address offset determining step, wherein the first address offset defines a number of memory locations by which the pointer address of the pointer element is spaced apart from a first memory address of the program state in the first memory area; and
identifying a program object which is spaced apart from the first memory location of the program state by the first address offset according to the arrangement structure of the program state as a first program object, the memory address of which in the first memory area corresponds to the pointer address of the pointer element in a first program object identifying step;

identifying the first program object with the pointer object referenced by the pointer element in a pointer object identifying step;

determining a fully qualified designation of the identified pointer element in a full designation determining step; and displaying the fully qualified designation of the pointer object referenced by the pointer element on a display element connected to the controller in a displaying step.

2. The method according to claim 1, wherein a program object of the program state is configured as a superordinate second program object, wherein the superordinate second program object comprises at least one subordinate partial program object, wherein the first program object is comprised as a subordinate partial program object by the superordinate second program object; and wherein the first program object identifying step comprises:

identifying a program object of the program state for which, according to the respective memory position and memory size, a memory area is defined comprising a memory location spaced apart from the first memory location of the program state by the first address offset, as the superordinate second program object, and identifying the superordinate second program object as the program object occupying, in the first memory location of the program state, a memory location comprising the pointer address of the pointer element, in a second program object identifying step;

determining a second address offset in a second address offset determining step, wherein the second address offset is determined by a difference between the first address offset and the first relative memory address of the second program object;

determining a data type of the superordinate second program object in a second data type determining step, wherein the data type determines a data structure of the superordinate second program object in which a number of subordinate partial program objects of the superordinate second program object are defined and a memory size and a memory position within the data structure of the superordinate second program object are determined for each subordinate partial program object; and identifying a subordinate partial program object of the superordinate second program object which is spaced apart from a first memory location of the superordinate second program object by the second address offset according to the data structure of the superordinate second program object, and identifying the subordinate partial program object of the superordinate second program object as the first program object, the memory address of which corresponds to the pointer address of the pointer element.

3. The method according to claim 2, wherein a program object of the program state is configured as a superordinate third program object, wherein the superordinate third program object comprises at least one subordinate partial program object, and wherein the superordinate second program object is comprised as a subordinate partial program object by the superordinate third program object; and wherein the second program object identifying step comprises:

identifying a program object of the program state for which, according to the respective memory position and memory size, a memory area is defined comprising a memory location spaced apart from the first memory location of the program state by the first address offset, as the superordinate third program object, and identifying the superordinate third program object as the program object occupying, in the first memory location of the program state, a memory location comprising the pointer address of the pointer element, in a third program object identifying step;

determining a third address offset in a third address offset determining step, wherein the third address offset is determined by a difference between the first address offset and a first relative memory address of the third program object;

determining a data type of the superordinate third program object in a third data type determining step, wherein the data type determines a data structure of the superordinate third program object in which a number of subordinate partial program objects of the superordinate third program object are defined and a memory size and a memory position within the data structure of the superordinate second program object are determined for each subordinate partial program object; and identifying a subordinate partial program object of the superordinate third program object which is spaced apart from a first memory location of the superordinate third program object by the third address offset according to the data structure of the superordinate third program object, and identifying the subordinate partial program object of the superordinate third program object as the superordinate second program object that in the first memory location of the program state a occupies memory location comprising the pointer address of the pointer element;

wherein the second address offset is determined by a difference between the first address offset and a sum of the first relative memory address of the third program object and the first relative memory address of the second program object.

4. The method according to claim 2, wherein a program object of the program state is configured as a superordinate n-th program object, wherein the superordinate n-th program object comprises, at n−1 nesting depth, subordinate partial program objects comprising one another, wherein the superordinate second program object is comprised as a subordinate partial program object at n−2 nesting depth by the superordinate n-th program object, and wherein the first program object is comprised as a subordinate partial program object at n−1th nesting depth by the superordinate n-th program object, wherein n is a natural number and larger than or equal to 4;

wherein the first program object identifying step comprises:

identifying a program object of the program state for which, according to the respective memory position and memory size, a memory area is defined comprising a memory location spaced apart from the first memory location of the program state by the first address offset, as the superordinate n-th program object, and identifying the superordinate n-th program object as the program object occupying, in the first memory location of the program state, a memory location comprising the pointer address of the pointer element, in an n-th program object identifying step;

determining an n-th address offset in an n-th address offset determining step, wherein the n-th address offset is determined by a difference between the first address offset and a first relative memory address of the n-th program object;

determining a data type of the superordinate n-th program object in an n-th data type determining step, wherein the data type determines a data structure of the superordinate n-th program object in which a number of subordinate partial program objects of the superordinate n-th program object is defined and a memory size and a memory position within the data structure of the superordinate n-th program object are determined for each subordinate partial program object; and identifying a subordinate partial program object of the superordinate n-th program object that is spaced apart from a first memory location of the superordinate n-th program object by the n-th address offset according to the data structure of the superordinate n-th program object, and identifying the subordinate partial program object of the superordinate n-th program object as a superordinate n−1th program object occupying a memory location in the first memory location of the program state comprising the pointer address of the pointer element in a n−1th program object identifying step;

wherein the n−1th program object identifying step comprises:

determining an n−1th address offset in an n−1th address offset determining step, wherein the n−1th address offset is determined by a difference between the first address offset and a sum of the first relative memory address of the n-th program object and a first relative address of the n−1th program object;

determining a data type of the superordinate n−1th program object in an n−1th data type determining step, wherein the data type determines a data structure of the superordinate n−1th program object in which a number of subordinate partial program objects of the superordinate n−1th program object are defined and for each subordinate partial program object a memory size and a memory position within the data structure of the superordinate n−1th program object are determined; and identifying a subordinate partial program object of the superordinate n−1th program object which is spaced apart from a first memory location of the superordinate n−1th program object by the n−1th address offset in accordance with the data structure of the superordinate n−1th program object, and identifying the subordinate partial program object of the superordinate n−1th program object as a superordinate n−2th program object occupying, in the first memory location of the program state, a memory location comprising the pointer address of the pointer element in a n−2th program object identifying step;

if n−2>2 applies, recursively executing the n−1th address offset determining step, the n−1th data type determining step, and the n−2th program object identifying step in a recursion step; and determining the second address offset in the second address offset determining step, wherein the second address offset is determined by a difference between the first address offset and a sum of first relative memory addresses of the n-th program object to second program object;

determining a data type of the superordinate second program object in the second data type determining step, wherein the data type determines a data structure of the superordinate second program object in which a number of subordinate partial program objects of the superordinate second program object are defined and a memory size and a memory position within the data structure of the superordinate second program object are determined for each subordinate partial program object; and identifying the subordinate partial program object of the superordinate second program object that is spaced apart from a first memory location of the superordinate second program object by the second address offset according to the data structure of the superordinate n−1th program object, and identifying the subordinate partial program object of the superordinate second program object as the first program object, the memory address of which corresponds to the pointer address of the pointer element.

5. The method according to claim 1, further comprising:

if the pointer address of the pointer element is arranged in the second memory area of the stack, determining a structure of the stack in a stack structure determining step, wherein a memory position and a memory size are assigned to each stack program object stored in the stack via the structure of the stack, wherein a memory position of a stack program object defines a number of memory locations by which a stack program object in a memory area is stored spaced apart from a first memory location of the stack; and determining a first stack address offset of the pointer address of the pointer element in a first stack address offset determining step, wherein the first stack address offset defines a number of memory locations by which the pointer address of the pointer element is spaced apart from a first memory address of the stack in the second memory area;

identifying a stack program object which is spaced apart from the first memory location of the stack by the first stack address offset according to an arrangement structure of the stack in which each stack program object is assigned a memory location and a memory size, as a first stack program object, the memory address of which in the second memory location corresponds to the pointer address of the pointer element in a first stack program object identifying step; and identifying the first stack program object by the pointer object referenced by the pointer element in the pointer object identifying step.

6. The method according to claim 5, wherein the first stack program object identifying step comprises:

identifying, taking into account the first stack address offset of the pointer address of the pointer element and the arrangement structure of the stack, a frame of the stack occupying, in the second memory area of the stack, a memory area comprising the memory address of the pointer address of the pointer element, in a frame identifying step;

identifying a function of the identified frame of the stack in a function identifying step; and identifying a local variable of the identified function, the memory address of which corresponds to the pointer address of the pointer element as the first stack program object of the stack, the memory address of which corresponds to the pointer address of the pointer element.

7. The method according to claim 5,
wherein a stack program object of the stack is configured as a superordinate second stack program object, wherein the superordinate second stack program object comprises at least one subordinate stack partial program object, and
wherein the first stack program object is comprised as a subordinate stack partial program object by the superordinate second stack program object;
wherein the first stack program object identifying step comprises:
identifying a program object of the stack for which, according to the respective memory position and memory size, a memory area is defined comprising a memory location which is spaced apart from the first memory location of the stack by the first stack address offset, as the superordinate second stack program object, and identifying the superordinate second stack program object as the program object occupying, in the second memory location of the stack, a memory location comprising the pointer address of the pointer element, in a second stack program object identifying step;
determining a second stack address offset in a second stack address offset determining step, wherein the second stack address offset is determined by a difference between the first stack address offset and a first relative memory address of the second stack program object;
determining a data type of the superordinate second stack program object in a second stack data type determining step, wherein the data type determines a data structure of the superordinate second stack program object in which a number of subordinate stack partial program objects of the superordinate second stack program object is defined, and a memory size and a memory location within the data structure of the superordinate second program object are determined for each subordinate stack partial program object; and
identifying a subordinate stack partial program object of the superordinate second stack program object that is spaced apart from a first memory location of the superordinate second stack program object by the second address offset according to the data structure of the superordinate second stack program object, and identifying the subordinate stack partial program object of the superordinate second stack program object as the first stack program object, the memory address of which corresponds to the pointer address of the pointer element.

8. The method according to claim 7,
wherein a stack program object of the stack is configured as a superordinate third stack program object, wherein the superordinate third stack program object comprises at least one subordinate stack partial program object, and
wherein the superordinate second stack program object is comprised as a subordinate stack partial program object by the superordinate third stack program object;
wherein the second stack program object identifying step comprises:
identifying a program object of the stack for which, according to the respective memory position and memory size, a memory area is defined comprising a memory location which is spaced apart from the first memory location of the stack by the first stack address offset, as the superordinate third stack program object, and identifying the superordinate third stack program object as the program object occupying, in the second memory location of the stack, a memory location comprising the pointer address of the pointer element, in a third stack program object identifying step;
determining a third stack address offset in a third stack address offset determining step, wherein the third stack address offset is determined by a difference between the first stack address offset and a first relative memory address of the third stack program object;
determining a data type of the superordinate third stack program object in a third stack data type determining step, wherein the data type determines a data structure of the superordinate third stack program object in which a number of subordinate stack partial program objects of the superordinate third stack program object are defined and a memory size and a memory location within the data structure of the superordinate third stack program object are determined for each subordinate stack partial program object; and
identifying a subordinate stack partial program object of the superordinate third stack program object that is spaced apart from a first memory location of the superordinate third stack program object by the third stack address offset according to the data structure of the superordinate third stack program object, and identifying the subordinate stack partial program object of the superordinate third stack program object as the superordinate second stack program object that occupies a memory area in the second memory area of the stack that comprises the pointer address of the pointer element;
wherein the second stack address offset is determined by a difference between the first stack address offset and a sum of the first relative memory address of the third stack program object and the first relative memory address of the second stack program object.

9. The method according to claim 7,
wherein a stack program object of the stack is configured as a superordinate n-th stack program object, wherein the superordinate n-th stack program object comprises, at n−1 nesting depth, subordinate stack partial program objects comprising one another,
wherein the superordinate second stack program object is comprised as a subordinate stack partial program object at n−2 nesting depth by the superordinate n-th stack program object, and
wherein the first stack program object is comprised as a subordinate stack partial program object at n−1th nesting depth by the superordinate n-th stack program object, where n is a natural number and larger than or equal to 4;
wherein the first stack program object identifying step comprises:
identifying a program object of the stack for which, according to the respective memory position and memory size, a memory area is defined comprising a memory location which is spaced apart from the first memory location of the stack by the first stack address offset, as the superordinate n-th stack program object, and identifying the superordinate n-th stack program object as the program object occupying, in the second memory location of the stack, a memory location comprising the pointer address of the pointer element, in an n-th stack program object identifying step;
determining an n-th stack address offset in an n-th stack address offset determining step, wherein the n-th stack address offset is determined by a difference between the first stack address offset and a first relative memory address of the n-th stack program object;

determining a data type of the superordinate n-th stack program object in an n-th stack data type determining step, wherein the data type determines a data structure of the superordinate n-th stack program object in which a number of subordinate stack partial program objects of the superordinate n-th stack program object is defined, and a memory size and a memory location within the data structure of the superordinate n-th stack program object are determined for each subordinate stack partial program object; and identifying a subordinate stack partial program object of the superordinate n-th stack program object that is spaced apart from a first memory location of the superordinate n-th stack program object by the n-th stack address offset according to the data structure of the superordinate n-th stack program object, and identifying the subordinate stack partial program object of the superordinate n-th stack program object as a superordinate n−1th stack program object occupying a memory location in the second memory location of the stack comprising the pointer address of the pointer element in a n−1th stack program object identifying step;

wherein the n−1th stack program object identifying step comprises:

determining an n−1th stack address offset in an n−1th stack address offset determining step, wherein the n−1th stack address offset is determined by a difference between the first stack address offset and a sum of the first relative memory address of the n-th stack program object and a first relative memory address of the n−1th stack program object;

determining a data type of the superordinate n-th stack program object in an n−1th stack data type determining step, wherein the data type determines a data structure of the superordinate n−1th stack program object in which a number of subordinate stack partial program objects of the superordinate n−1th stack program object is defined, and a memory size and a memory location within the data structure of the superordinate n−1th stack program object are determined for each subordinate stack partial program object; and identifying a subordinate stack partial program object of the superordinate n−1th stack program object that is spaced apart from a first memory location of the superordinate n−1th stack program object by the n−1th stack address offset according to the data structure of the superordinate n−1th stack program object, and identifying the subordinate stack partial program object of the superordinate n−1th stack program object as a superordinate n−2th stack program object occupying, in the second memory location of the program state, a memory location comprising the pointer address of the pointer element in a n−2th stack program object identifying step;

wherein the n−2th stack program object identifying step comprises:

if n−2>2 applies, recursively executing the n−1th stack address offset determining step and the n−2th stack program object identifying step in a further recursion step; and determining a second stack address offset in the second stack address offset determining step, wherein the second stack address offset is determined by a difference between the first stack address offset and a sum of first relative memory addresses of the n-th stack program object to the second stack program object;

determining a data type of the superordinate second stack program object in a second stack data type determining step, wherein the data type determines a data structure of the superordinate second stack program object in which a number of subordinate stack partial program objects of the superordinate second stack program object is defined and a memory size and a memory location within the data structure of the superordinate second stack program object are determined for each subordinate stack partial program object; and identifying a subordinate stack partial program object of the superordinate second stack program object that is spaced apart from a first memory location of the superordinate second stack program object by the second address offset according to the data structure of the superordinate second stack program object, and identifying the subordinate stack partial program object of the superordinate second stack program object as the first stack program object, the memory address of which corresponds to the pointer address of the pointer element.

10. The method according to claim 1, further comprising:
determining a data type of the first program object in a first data type determining step, wherein the data type of the first program object determines a data structure of the first program object; and/or
determining a data type of the first stack program object in a first stack data type determining step, wherein the data type of the first program object determines a data structure of the first program object.

11. The method according to claim 1, wherein the fully qualified designation of the pointer object referenced by the pointer element comprises the designations of first program object and/or of superordinate program objects or the designations of first stack program object and/or of superordinate stack program objects and/or of identified frame and/or a name of the identified function.

12. The method according to claim 1, wherein a superordinate program object or a superordinate stack program object is of a compound type, a field type, or of a character string type.

13. The method according to claim 1, further comprising:
selecting a plurality of program objects of the program state in a selecting step, wherein a selected program object is the pointer element;
determining fully qualified designations of the selected program objects in the full designation determining step; and
displaying the fully qualified designations of the selected program objects on the display element connected to the controller in the displaying step.

14. The method according to claim 1,
wherein in the displaying step, in addition to the fully qualified designation, a value of the respective program object is displayed; and
wherein the method further comprises:
adjusting at least one value of a program object in an adjusting step; and
controlling an automation process by the control program taking into account the at least one changed value of the at least one program object in a controlling step.

15. The method according to claim 1, wherein the method is carried out in a debugging process and/or is executed in a control process of the automation system.

16. The method according to claim 1, wherein the display element is configured as a human-machine interface and is integrated into the control system.

17. An automation system comprising a controller and a display element connected to the controller, wherein the controller is configured to carry out the method according to claim 1.

* * * * *